(12) United States Patent
Olson et al.

(10) Patent No.: US 12,499,045 B1
(45) Date of Patent: Dec. 16, 2025

(54) EFFICIENT DATA PROCESSING

(71) Applicant: Arm Limited, Cambridge (GB)

(72) Inventors: Jens Olson, San Jose, CA (US); John Wakefield Brothers, III, Calistoga, CA (US)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 18/778,001

(22) Filed: Jul. 19, 2024

(51) Int. Cl.
G06F 12/08 (2016.01)
G06F 12/0802 (2016.01)

(52) U.S. Cl.
CPC .... *G06F 12/0802* (2013.01); *G06F 2212/608* (2013.01)

(58) Field of Classification Search
CPC .............. G06F 12/0802; G06F 2212/608
USPC .......................................... 711/118
See application file for complete search history.

(56) References Cited

U.S. PATENT DOCUMENTS

| | | | |
|---|---|---|---|
| 10,489,479 B1 | 11/2019 | Shalev et al. | |
| 2018/0107506 A1 | 4/2018 | Suzuki et al. | |
| 2018/0373540 A1 | 12/2018 | Bao et al. | |
| 2019/0340010 A1 | 11/2019 | Lee et al. | |
| 2021/0117806 A1 | 4/2021 | Liu et al. | |
| 2021/0255843 A1 | 8/2021 | Bequet et al. | |
| 2021/0255976 A1* | 8/2021 | Gottscho | G06F 13/28 |
| 2021/0294960 A1 | 9/2021 | Wu et al. | |
| 2022/0309336 A1 | 9/2022 | Minkin | |
| 2023/0008622 A1 | 1/2023 | Boyd et al. | |
| 2023/0121044 A1 | 4/2023 | Grover et al. | |
| 2023/0289304 A1 | 9/2023 | Minkin et al. | |
| 2024/0103912 A1 | 3/2024 | Etsion et al. | |
| 2024/0134553 A1* | 4/2024 | Symes | G06N 3/063 |

(Continued)

FOREIGN PATENT DOCUMENTS

| | | |
|---|---|---|
| CN | 108537330 B | 9/2020 |
| EP | 3588281 A1 | 1/2020 |

(Continued)

OTHER PUBLICATIONS

Taslynow Anuar et al: Tensor Yard: One-Shot Algorithm of Hardware-Friendly Tensor-Train Decomposition for Convolutional Neural Networks, Aug. 9, 2021.

(Continued)

*Primary Examiner* — Hua J Song
(74) *Attorney, Agent, or Firm* — EIP US LLP

(57) ABSTRACT

A method and processing unit for mapping coordinates of a tensor to a shared storage of the processing unit. The processing unit comprises processing slices, each for performing a suboperation of the operation, and having prioritized access to a preferred portion of the shared storage. The method comprises obtaining a layout indicating configurable data regions in the shared storage. The configurable data regions are banks comprising regions of shared storage. A stride based on for at least one dimension of the tensor and the layout is obtained. Coordinates of the tensor are mapped to locations in the shared storage, wherein the mapping comprises calculating a bank number and offset which are calculated based on coordinates of the tensor, the layout of the configurable data regions, and the stride of the at least one dimension. Each processing slice performs the suboperation on the data of the tensor based on the mapping.

20 Claims, 13 Drawing Sheets

(56) References Cited

U.S. PATENT DOCUMENTS

| | | |
|---|---|---|
| 2024/0168915 A1 | 5/2024 | Du et al. |
| 2024/0176663 A1 | 5/2024 | Hirisave Chandra Shekhara et al. |
| 2024/0202003 A1 | 6/2024 | Chajdas et al. |

FOREIGN PATENT DOCUMENTS

| | | |
|---|---|---|
| KR | 102480287 B1 | 12/2022 |
| WO | 2024153909 A1 | 7/2024 |

OTHER PUBLICATIONS

Hsu Kuan-Chieh et al: Accelerating Applications using Edge Tensor Processing Units, Nov. 14, 2021.
International Search Report and Written Opinion dated Mar. 25, 2024 for PCT Application No. PCT/GB2024/050076.
UKIPO Search Report dated Nov. 10, 2023 for Application No. GB2307069.1.
International Search Report and Written Opinion dated Sep. 3, 2025 for PCT Application No. PCT/GB2025/051340.
International Search Report and Written Opinion Dated Sep. 29, 2025 for PCT Application No. PCT/GB2025/051342.
International Search Report and Written Opinion Dated Oct. 13, 2025 for PCT Application No. PCT/GB2025/051609.

\* cited by examiner

| Section# | 0 | 1 | 2 | 3 | 4 | 5 | 6 |
|---|---|---|---|---|---|---|---|
| description | IFM load | Weight load | Bias load | Conv | Scale load | Scale | OFM write |
| Func unit | IR | WD | IR | CE | IR | VE | OW |
| S0 pipe | - | - | - | 0 | - | 3 | 5 |
| S1 pipe | - | - | - | 1 | - | 4 | - |
| S2 pipe | - | - | - | 2 | - | - | - |
| Dest pipe | 0 | 1 | 2 | 3 | 4 | 5 | - |
| Dimension mapping for conv | Number of steps along each dimension | | | | | | |
| OFM C | 5 | 5 | 5 | 5 | 5 | 5 | 5 |
| Batch | 1 | 1 | 1 | 1 | 1 | 1 | 1 |
| OFM Y | 4 | 4 | 1 | 4 | 1 | 4 | 4 |
| OFM X | 3 | 3 | 1 | 3 | 1 | 3 | 3 |
| IFM C | 2 | 2 | 1 | 2 | 1 | 1 | 1 |
| Kernel Y | 1 | 1 | 1 | 1 | 1 | 1 | 1 |
| Kernel X | 1 | 1 | 1 | 1 | 1 | 1 | 1 |
| Unused | 1 | 1 | 1 | 1 | 1 | 1 | 1 |
| DIMS_INC_RUN | 7 | 7 | 2 | 7 | 2 | 4 | 4 |

402

| Section# | 0 | 1 | 2 | 3 | 4 | 5 | 6 |
|---|---|---|---|---|---|---|---|
| description | IFM load | Weight load | Bias load | Conv | Scale load | Scale | OFM write |
| Func unit | IR | WD | IR | CE | IR | VE | OW |
| S0 pipe | - | - | - | 0 | - | 3 | 5 |
| S1 pipe | - | - | - | 1 | - | 4 | - |
| S2 pipe | - | - | - | 2 | - | - | - |
| Dest pipe | 0 | 1 | 2 | 3 | 4 | 5 | - |
| Dimension mapping for conv | Number of steps along each dimension | | | | | | |
| OFM C | 5 | 5 | 5 | 5 | 5 | 5 | 5 |
| Batch | 1 | 1 | 1 | 1 | 1 | 1 | 1 |
| OFM Y | 4 | 4 | 1 | 4 | 1 | 4 | 4 |
| OFM X | 3 | 3 | 1 | 3 | 1 | 3 | 3 |
| IFM C | 2 | 2 | 1 | 2 | 1 | 1 | 1 |
| Kernel Y | 1 | 1 | 1 | 1 | 1 | 1 | 1 |
| Kernel X | 1 | 1 | 1 | 1 | 1 | 1 | 1 |
| Unused | 1 | 1 | 1 | 1 | 1 | 1 | 1 |
| DIMS_INC_RUN | 7 | 7 | 2 | 7 | 2 | 4 | 4 |
| DIMS_INC_BUF | 7 | 7 | 2 | 4 | 2 | 4 | 4 |

| Time | 0 | 1 | 2 | 3 | 4 | 5 | 6 | 7 | 8 | 9 | 10 | 11 |
|---|---|---|---|---|---|---|---|---|---|---|---|---|
| LHS | A | B | C | D | E | F | G | H | | | | |
| RHS | A | B | C | D | E | F | G | H | | | | |
| Reverse | | A | B | C | D | E | F | G | H | | | |
| MatMul | | | A | B | C | D | E | F | G | H | | |
| Rescale | | | | | | | A-D | | | | E-H | |
| Output | | | | | | | | A-D | | | | E-H |

Fig. 8

| Slice 0 | Slice 1 | Slice 2 | Slice 3 | Slice 4 | Slice 5 | Slice 6 | Slice 7 |
|---|---|---|---|---|---|---|---|
| Bank0 (0,0) | Bank1 (1,0) | Bank2 (2,0) | Bank3 (3,0) | Bank4 (4,0) | Bank5 (5,0) | Bank6 (6,0) | Bank7 (7,0) |
| Bank8 (0,1) | Bank9 (1,1) | Bank10 (2,1) | Bank11 (3,1) | Bank12 (4,1) | Bank13 (5,1) | Bank14 (6,1) | Bank15 (7,1) |
| Bank16 (0,2) | Bank17 (1,2) | Bank18 (2,2) | Bank19 (3,2) | Bank20 (4,2) | Bank21 (5,2) | Bank22 (6,2) | Bank23 (7,2) |
| Bank24 (0,3) | Bank25 (1,3) | Bank26 (2,3) | Bank27 (3,3) | Bank28 (4,3) | Bank29 (5,3) | Bank30 (6,3) | Bank31 (7,3) |
| Bank32 (0,4) | Bank33 (1,4) | Bank34 (2,4) | Bank35 (3,4) | Bank36 (4,4) | Bank37 (5,4) | Bank38 (6,4) | Bank39 (7,4) |
| Bank40 (0,5) | Bank41 (1,5) | Bank42 (2,5) | Bank43 (3,5) | Bank44 (4,5) | Bank45 (5,5) | Bank46 (6,5) | Bank47 (7,5) |
| Bank48 (0,6) | Bank49 (1,6) | Bank50 (2,6) | Bank51 (3,6) | Bank52 (4,6) | Bank53 (5,6) | Bank54 (6,6) | Bank55 (7,6) |
| Bank56 (0,7) | Bank57 (1,7) | Bank58 (2,7) | Bank59 (3,7) | Bank60 (4,7) | Bank61 (5,7) | Bank62 (6,7) | Bank63 (7,7) |
| Bank64 (0,8) | Bank65 (1,8) | Bank66 (2,8) | Bank67 (3,8) | Bank68 (4,8) | Bank69 (5,8) | Bank70 (6,8) | Bank71 (7,8) |
| Bank72 (0,9) | Bank73 (1,9) | Bank74 (2,9) | Bank75 (3,9) | Bank76 (4,9) | Bank77 (5,9) | Bank78 (6,9) | Bank79 (7,9) |

EFFICIENT DATA PROCESSING

BACKGROUND OF THE INVENTION

Field of the Invention

The present invention relates to methods, processing units, chip containing products, and, and non-transitory computer-readable storage media mapping coordinates of a multi-dimensional tensor of data.

Description of the Related Technology

Certain data processing techniques, such as neural network processing a graphics processing, involve the processing and generation of considerable amounts of data using operations. It is desirable to efficiently handle the data when processing by an operation set.

SUMMARY

According to a first aspect of the present invention, there is provided a method of mapping coordinates of a multi-dimensional tensor of data to be processed to a shared storage of a processing unit in response to task data defining an operation, the processing unit comprising a plurality of processing slices, each processing slice for performing a respective sub-operation of the operation, and, having prioritized access to at least a respective preferred portion of the shared storage than a respective less preferred portion of the shared storage, the method comprising the steps of obtaining a layout of the shared storage, the layout indicating the layout of configurable data regions within the shared storage wherein the configurable data regions are defined in terms of banks comprising regions of the shared storage, and obtaining a stride for at least one dimension of the multi-dimensional tensor. Co-ordinates of the multi-dimensional tensor are mapped to locations in the shared storage, wherein the mapping comprises calculating a bank number and an offset, wherein the bank number and offset are calculated based on coordinates of the multi-dimensional tensor, the layout of the configurable data regions and the stride of the at least one dimension. Each processing slice performs the respective sub-operation on the data of the multi-dimensional tensor in accordance with the mapping.

Preferably, the respective sub-operations operate on respective portions of the multi-dimensional tensor, and wherein, for a given processing slice, the mapping is such that the portion of the multi-dimensional tensor operated on by the given processing slice is mapped to the preferred portion of the shared storage for the processing slice.

The processing unit may be arranged to employ a predetermined scheme to determine which processing slice is to perform the respective sub-operations of the operation, the predetermined scheme based on the co-ordinate of the multi-dimensional tensor being operated on by the respective sub-operations, and wherein mapping the co-ordinates of the multi-dimensional tensor to locations in the shared storage is based on the predetermined scheme.

Optionally, the processing unit is arranged to determine the processing slice to perform a given sub-operation based on a co-ordinate in a particular dimension of a portion of the multi-dimensional tensor to be operated on, and mapping the co-ordinates of the multi-dimensional tensor to locations in the shared storage is based on the co-ordinate of the multi-dimensional tensor in the particular dimension to ensure that the portion of the multi-dimensional tensor operated on by the given sub-operation is mapped to the preferred portion of the shared storage for the processing slice.

The bank number and offset represent at least a part of one or more configurable data regions of the shared storage for use by the operation, and wherein the task data defining the operation is for data of the multi-dimensional tensor, stored in the one or more configurable data regions of the shared storage.

Preferably, each processing slice comprises first processing circuitry for accessing data across the shared storage, and second processing circuitry for accessing data of the multi-dimensional tensor in the portion of the shared storage.

The shared storage may be distributed among processing slices.

Optionally, the mapping of the coordinates is such that data required by the sub-operation being executed by at least one of the first processing circuitry or the second processing circuitry of a given processing slice is stored in the shared storage of the given processing slice.

The stride may be further determined based on a size of the data of the multi-dimensional tensor. The multi-dimensional tensor may be a four-dimension tensor, and the given dimension of the multi-dimensional tensor may be dimension three.

According to a second aspect of the present invention, there is provided a processing unit for handling a task in response to task data defining at least one operation of the task, comprising at least one multi-dimensional tensor of data, the processing unit comprises a plurality of processing slices for performing a respective sub-operation of the operation of the task. Each processing slice comprises a first processing circuitry; and a second processing circuitry; and a transform unit communicably coupled to each of the plurality of regions. Each processing slice has prioritized access to at least a respective preferred portion of the shared storage than a respective less preferred portion of the shared storage, and wherein a multi-dimensional tensor used in the execution of the task is distributed within the shared storage of the plurality of processing slices. The distribution comprises obtaining a layout of the shared storage, the layout indicating the layout of configurable data regions of the shared storage across the plurality of processing slices wherein the configurable data regions are defined in terms of banks comprising regions of the shared storage, and obtaining a stride for at least one dimension of the multi-dimensional tensor. Co-ordinates of the multi-dimensional tensor are mapped to locations in the shared storage, wherein the mapping comprises calculating a bank number and an offset, wherein the bank number and offset are calculated based on coordinates of the multi-dimensional tensor, the layout of the configurable data regions and the stride of the at least one dimension. Each processing slice performs the respective sub-operation on the data of the multi-dimensional tensor in accordance with the mapping.

Preferably, a bank of the shared storage has a high bandwidth connection to the first processing circuitry, and the second processing circuitry of a given processing slice.

The shared storage may be static random access memory.

Optionally, the transform unit is further part of a common processing slice, the common processing slice comprising a synchronization unit and the synchronization unit is for determining the stride based on the given dimension of the multi-dimensional tensor.

Each of the plurality of processing slices may further comprise accumulator storage.

Preferably, the processing unit comprises eight processing slices.

According to a third aspect of the present invention, there is provided a chip-containing product comprising the processing unit, wherein the processing unit is assembled on a further board with at least one other product component.

According to a fourth aspect of the present invention, there is provided a non-transitory computer-readable medium having stored thereon computer-readable code for fabrication of the processing unit for handling a task comprising at least one multi-dimensional tensor.

According to a fifth aspect of the present invention, there is provided a non-transitory computer-readable storage medium comprising a set of computer-readable instructions stored therein which when executed by at least one processor, are arranged to cause the at least one processor to obtain a layout of a shared storage that is logically distributed among a plurality of processing slices of a processing unit, each processing slice performing at least one sub operation of an operation received as part of task data, and having prioritized access to at least a respective preferred portion of the shared storage than a respective less preferred portion of the shared storage, the layout indicating the layout of configurable data regions of the shared storage wherein the configurable data regions are defined in terms of banks comprising regions of the shared storage, and obtain a stride for at least one dimension of a multi-dimensional tensor and the layout. Co-ordinates of a multi-dimensional tensor are mapped to locations in the shared storage, wherein the mapping comprises calculating a bank number and an offset, wherein the bank number and offset are calculated based on coordinates of the multi-dimensional tensor, the layout of the configurable data regions and the stride of the at least one dimension. Each processing slice performs a sub-operation of an operation on data of the multi-dimensional tensor in accordance with the mapping.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

FIG. 5 illustrates a table showing data relating to a number of sections according to the present disclosure;

FIG. 8 illustrates an example iteration through blocks for the chain of operations of the examples illustrated in FIGS. 6 and 7 for a series of invocation time instances 0 to 11;

FIG. 11 illustrates schematically a shared memory according to an example;

DETAILED DESCRIPTION OF CERTAIN INVENTIVE EMBODIMENTS

Figure 1A:
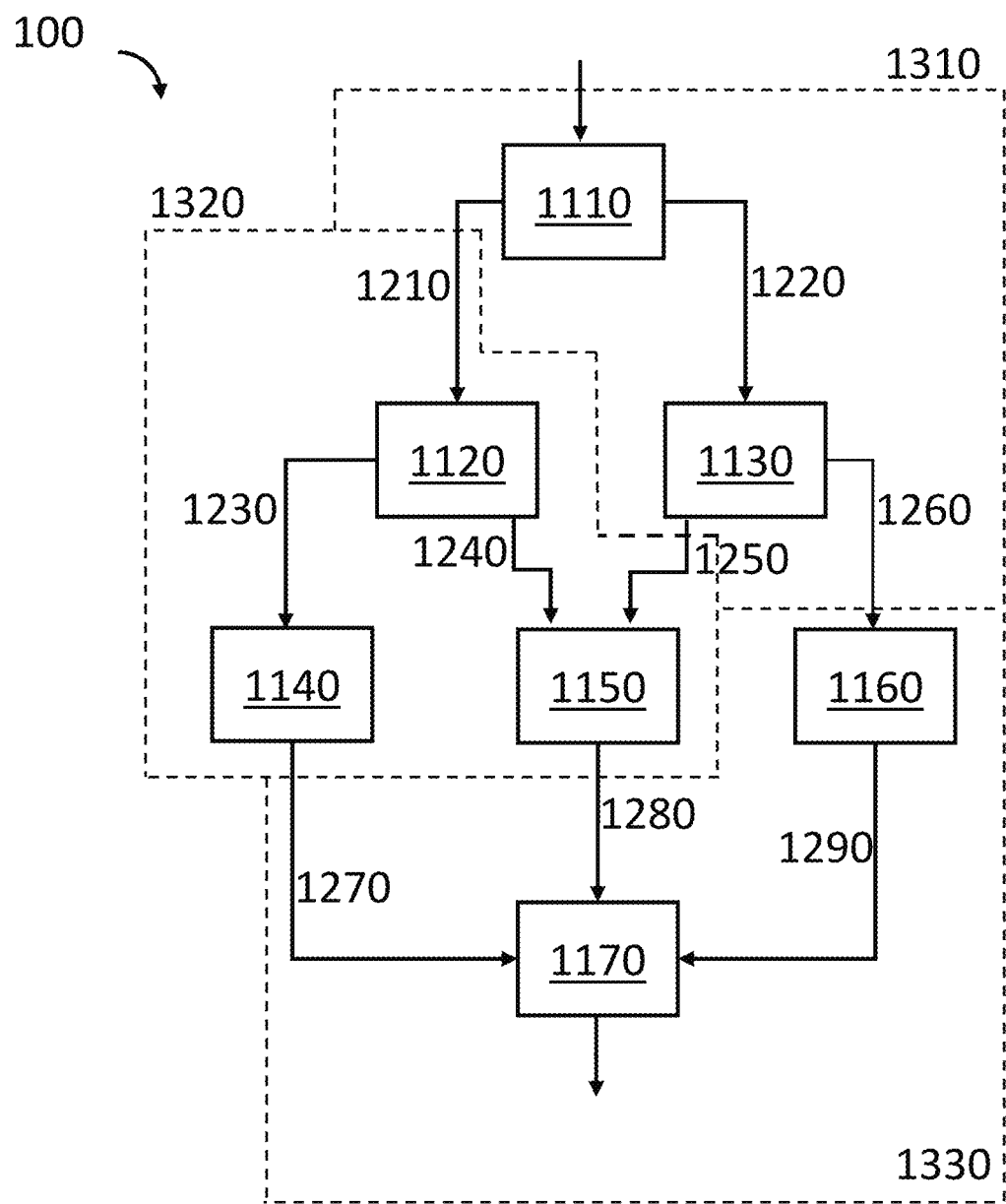
FIG. 1a illustrates an example directed acyclic graph in which sections are interconnected by a series of pipes according to the present disclosure.

Examples herein relate to a processor for handling data, the processor comprising a handling unit, a plurality of storage elements, and a plurality of execution units. The processor is configured to obtain, from storage, task data that describes a task to be executed in the form of a graph of operations, such as a directed acyclic graph. Each of the operations maps to a corresponding execution unit of the processor, and wherein each connection between operations in the graph maps to a corresponding storage element of the processor, the task data further defining an operation space representing the dimensions of a multi-dimensional arrangement of the connected operations to be executed. Whilst the examples described below refer to a directed acyclic graph of operations, it will be appreciated that any type of graph of operations may be used.

For each of a plurality of portions of the operation space, the processor is configured to transform the portion of the operation space to generate respective operation-specific local spaces for each of the plurality of the operations of the graph.

The processor is further configured to dispatch, to each of a plurality of the execution units associated with operations for which transformed local spaces have been generated, invocation data describing the operation-specific local space, and at least one of a source storage element and a destination storage element corresponding to a connection between the particular operation that the execution unit is to execute and a further adjacent operation in the acyclic graph to which the particular operation is connected.

The present disclosure relates to executing a graph of operations (referred to as sections) connected by various connections (referred to as pipes). By providing the capability to operate upon a sequence of connected operations (sections) that can be defined within an operation space common to the sequence of operations, it can be guaranteed that all coordinates required by the operations within the operation space are reachable when executing that sequence of operations. For each execution of an operation (or portion of an operation), the operation space is transformed into a local section space for that operation. More generally, a directed acyclic graph of operations comprises vertices (cf. the operations) connected by edges, such that each edge is directed from one vertex to another in such a way that the direction of the edges do not form a closed loop. As described above, the tasks may be executed in the form of a graph of operations representing a given sequence of the operations. This may be represented as any type of graph not just a directed acyclic graph. In such an example, the graph of operation comprises vertices (cf. the operations) connected by directed or undirected edges. In some examples, the directed edges may form closed loops.

Each operation (section) is linked by corresponding pipes to form a directed acyclic graph of operations. For each operation, source and destination pipes can be defined and, under the control of a handling unit, the execution of sections can be issued by issuing invocation data that defines in the source and destination pipes for the operation. This execution of the graph of operation by respective execution units is therefore implicitly ordered by the dependencies on specific inputs to the operation. The result of this implicit ordering being a simplified orchestration of operations amongst the execution units of the processor. Put another way, sections and their directed acyclic relationship to each other can be determined by their pipe usage (e.g. their producers/consumers).

In the present disclosure, by transforming from an operation space, there is guaranteed that for each possible operation there is a specific coordinate space referred to as section-space (or section-specific local space). For every operation, there may be a fixed function transform from their individual section-space to each of their input and output data (pipes); this may be different for multiple inputs/output. For element-wise operations, the transform from section-space to input and output pipes will be an identity mapping: no transformation is required. For convolution, the output is similarly the identity of the section-space, with a transform only required to the inputs. An exception to this being that for some operations (e.g. convolution) the output space is only the outer four dimensions. Further, the inputs to some operations may have non-identity transforms from section space, and may be different to each other. However, in the present disclosure every operation is defined with its own independent section-space, that is specific to that section (or operation) without needing to map onto the output of other operations.

Different operations having different types are chained together by defining the common operation-space for the whole graph (or chain of operations), and then defining transforms from the operation-space to each operation's individual section-space. Now each hardware unit only needs to understand their fixed-function transform from section-space to input/output spaces, without needing to understand the chain of operations preceding or succeeding it. For example, it is possible to chain additional operations in front of or after a convolution operation and stitch a wider variety of operations together, provided that the conditions of a valid operation space exist. Since all sections are iterating through the same operation-space in execution, blocks of data are aligned. For example, a first block from a memory read operation will be the first block into the data processing operation, and this will trickle through to the first block in the memory write operation. This is a simplification given that for some operations (reduction and broadcast operations) since the block may be grouped with data from other blocks to form a new merged block, but generally holds as a principle. Operation-space is typically mapped to a specific operation's space in the graph, with programmatic transforms provided for all other operations.

Operations accessing pipes might have an additional transform to access data stored in pipes. For example, this might be a different transform for the different pipes: different for multiple inputs, different for outputs. This transform is defined in the nature of the operation and is fixed function.

In summary, an operation's section space might be mapped to input and/or output (they can be the same), or operation's section space might be mapped separately in which case a fixed function transform might be needed. In this way, the proposed approach allows for more compartmentalized functionality in separate execution units. The execution units of the processor can therefore be implemented in a more simplified structure since there is no need to provide the capability in each execution unit to perform complex transforms on the front-end or output of the execution units. Instead, the transformation from operation space to section space (and therefore the management of compatibility and correct structuring of data between consecutive operations) is managed and issued centrally by a single handling unit based upon the dimensionality of a pre-defined operation space—e.g. by a descriptor that defines the operation space and the sections and pipes that form the graph.

Since the single transform unit can execute the transforms from operation to section-space, the processor is able to add support for additional operations in the future without the need for significant hardware modification to the execution units to allow additional operations to be chained in front of or in any place in a chain. This allows new functionality to be added easily. As an example: for a convolution operation, dynamic weights can be added easily by adding a data re-ordering unit or transform capable of transforming a tensor in an activation layout into a weight layout, which can be handled by a convolution engine.

Moreover, many less-common operations can be broken down into smaller units of execution (e.g. by simpler fundamental operations from which more complex (or less-common) operations can be constructed). Iteration of more common operations can enable support for larger operations that cannot otherwise be accommodated within the constraints of the processor, rather than implementing native support within an execution unit. For example, for operations convolution operations with a stride value>1 can be implemented by breaking the kernel down into single element increments and iteratively invoking a convolution engine with a 1 element kernel, thus making larger strides supported. Similar examples exist for operations that require a dilation value>1.3D convolution operations can similarly be implemented as iterative 2D convolution operations.

In some examples, the processor is optionally configured such that more than one operation in the acyclic graph of operations is mapped to the same executing unit of the processor; and more than one connection in the acyclic graph of operations is respectively mapped to a different portion of the same storage element.

In some examples, the processor is optionally configured such that each execution unit of the plurality of execution units of the processor is configured to perform a specific operation type and wherein the mapping between operations in the acyclic graph and the execution units is defined based upon compatibility of execution between the operation in acyclic graph and the specific operation type of the execution unit.

In some examples, the processor is optionally configured such that the task data comprises an element-count value indicating a count of a number of elements mapping to each execution unit having a specific operation type, wherein each element corresponds to an instance of use of an execution unit in order to execute each operation in the acyclic graph; and a pipe-count value indicating a count of the number of pipes needed to execute the task.

In some examples, the processor is optionally configured such that the task data further comprises, for each element in the acyclic graph, element configuration data defining data used to configure the particular execution unit when executing the operation.

In some examples, the processor is optionally configured such that the element configuration data comprises an offset value pointing to a location in memory of transform data indicating the transform to the portion of the operation space to be performed to generate respective operation-specific local spaces for each of the plurality of the operations of the acyclic graph.

In some examples, the processor is optionally configured such that the task data comprises transform program data defining a plurality of programs, each program comprising a sequence of instructions selected from a transform instruction set. The processor is optionally configured such that the transform program data is stored for each of a pre-determined set of transforms from which a particular transform is selected to transform the portion of the operation space to generate respective operation-specific local spaces for each of the plurality of the operations of the acyclic graph.

In some examples, the processor is optionally configured such that the transform program data is configured to perform the particular transform upon a plurality of values stored in boundary registers defining the operation space to generate new values in the boundary registers.

In some examples, the processor is optionally configured to iterate over the operation space in blocks, wherein the blocks are created according to a pre-determined block size.

In some examples, the processor is optionally configured such that dispatch of invocation data is controlled based upon a value identifying the dimensions of the operation space for which changes of coordinate in said dimensions while executing the task causes the operation to execute, and a further value identifying the dimensions of the operation space for which changes of coordinate in said dimensions while executing the task causes the operation to store data in the storage, wherein the stored data being ready to be consumed by an operation.

Execution of a Directed Acyclic Graph (DAG)

Whilst the examples described below refers to the execution of a directed acyclic graph, it will be appreciated that the method described may be utilized in the execution of any type of graph, not just a directed acyclic graph.

Many data structures to be executed in a processor can be expressed as a graph, such as a directed acyclic graph. Examples of such data structures include neural networks which can be represented as a directed acyclic graph of operations that wholly compose the operations required to execute a network (i.e. to executed the operations performed across the layers of a neural network). A directed acyclic graph is a data structure of operations (herein also referred to as 'sections') having directed connections therebetween that indicate a flow of operations such that those directed connections do not form a closed loop. The connections between operations (or sections) present in the graph of operations are also to referred herein as 'pipes'. An acyclic graph may contain any number of divergent and convergent branches.

FIG. 1a illustrates an example directed acyclic graph in which sections are interconnected by a series of pipes. Specifically, an initial section, section 1 (1110) represents a point in the acyclic graph at which an operation, operation A, is to be performed when executing the graph. The output of operation A at section 1, 1100, is connected to two further sections, section 2 (1120) and section 3 (1130) at which respective operations B and C are to be performed. The connection between section 1 (1110) and section 2 (1120) can be identified as a pipe with a unique identifier, pipe 1 (1210). The connection between section 1 (1110) and section 3 (1130) can be identified as a pipe with a different unique identifier, pipe 2 (1220). The output of section 1, which is the result of performing operation A on the input to section 1, can be provided to multiple subsequent sections in a branching manner.

More generally, sections in the acyclic graph may receive multiple inputs, each from a respective different section in the acyclic graph via a respective different pipe. For example, section 1150 in FIG. 1a receives a first set of input data via pipe 1240 from section 1120 and a second set of input data via pipe 1250. Depending on the nature of the operation performed in a particular section and the dependencies of subsequent operations on the output of the operation, any number of input and output pipes may be connected to a particular section in the acyclic graph.

The acyclic graph can be represented by a number of sub-graphs each containing a subset of the sections in the graph. FIG. 1a illustrates an arrangement where the graph 110 is broken down into three sub-graphs 1310, 1320, and 1330 which can be connected together to form the complete graph. For example, sub-graph 1310 contains sections 1110 and 1130 (as well as the corresponding pipe 1220), sub-graph 1320 contains sections 1120, 1140, and 1150 (as well as corresponding pipes 1230, 1240), and sub-graph 1330 contains sections 1160 and 1170.

The deconstruction of a graph 100 into sub-graphs is particularly useful when seeking to execute the graph since it would be possible to separately execute the sub-graphs which allows for parallelization of execution where there are no dependencies between sub-graphs. This can be particularly useful in a multi-processor environment where sub-graphs can be allocated for execution by different processors in the multi-processor environment. However, as shown in FIG. 1a sub-graph 1320 has a dependency on the execution of operation A and section 1110 and sub-graph 1330 has a dependency on sub-graph 1310. As such, execution of sub-graph 1330 may need to be stalled until sub-graph 1310 has been completed. It will therefore be appreciated that it is necessary to carefully select the appropriate sub-graph arrangement to maximise or improve the execution efficiency of the graph.

The operations performed when executing a neural network can be broken down into a sequence of operations forming an acyclic graph in the form described in respect of FIG. 1a. The detailed description herein will describe an arrangement for executing an acyclic graph of operations in an improved manner.

Operation Space

When executing chains of operations, for example structured in a directed acyclic graph, each section could represent a different operation. It is not necessary for each operation to be of the same type or nature. This is particularly the case where the graph of operations is used to represent the processing of a neural network. The machine learning software ecosystem allows for a diverse structure of neural networks that are applicable to many different problem spaces, and as such there is a very large possible set of operators from which a neural network can be composed. The inventors have recognized that the possible set of operations from which sections can be formed can be hard to manage when seeking to design hardware to enable the execution (also referred to as "acceleration") of these operations-particularly when chained together. For example, enabling fixed-function operation of each possible type of operation can result in inefficient hardware by requiring support for obscure or complex operations (sections).

As a result there are significant challenges in designing and building hardware capable of executing all types of neural networks created by the current machine learning toolsets. As a result, the inventors have recognized that it is desirable to define a set of pre-determined low-level operations from which a broad range of possible higher-level operations that correspond with various machine learning tool sets can be built. One example of such a low-level set of operations, is the Tensor Operator Set Architecture (TOSA). The Tensor Operator Set Architecture (TOSA) provides a set of whole-tensor operations commonly employed by Deep Neural Networks. The intent is to enable a variety of implementations running on a diverse range of processors, with the results at the TOSA level consistent across those implementations. Applications or frameworks which target TOSA can therefore be deployed on a wide range of different processors, including single-instruction multiple-data (SIMD) CPUs, graphics processing units (GPUs) and custom hardware such as neural processing units/tensor processing units (NPUs/TPUs), with defined accuracy and compatibility constraints. Most operators from the common ML frameworks (TensorFlow, PyTorch, etc.) should be expressible in TOSA. It is expected that there will be tools to lower from ML frameworks into TOSA.

However, even with such operator sets existing, the inventors have recognized a need to implement the operator sets in a manner that can be executed efficiently, both in terms of complexity and while minimizing the need to perform external memory transactions. To enable this, the inventors have recognized that it is useful to consider that many of the operations in a defined operation set (such as TOSA) can be represented as a loop of scalar operations.

For example, consider a 2D convolution operation which can be expressed as a multi-dimensional loop of scalar operations. These may need to be executed on input 2D input data having dimensions input X (IX) and input Y (IY):

- (input) Input channel (IC)—a dimension representing the input channels upon which the operation is to be performed (in the example of images this may be three channels each representing one of red, green, and blue input channels)
- (input) Kernel dimension X (KX)—a first dimension X of a 2D kernel;
- (input) Kernel dimension Y (KY)—a second dimension Y of a 2D kernel;
- (output) Output X (OX)—a first dimension of the output feature map for the convolution operation;
- (output) Output Y (OY)—a second dimension of the output feature map for the convolution operation;
- (output) Batch (N)—a batch dimension of the operation, where the operation is to be batched;
- (output) Output channel—a dimension representing the output channels to be produced for the 2D convolution operation.

In one proposed ordering, KY/KX can be consider the inner-most dimensions and N is the outer-most dimension.

For the 2D convolution operation example above, it is possible to express the operation to be performed as a "nested for-loop" of scalar operations as is illustrated in the pseudocode set out below. In practice, when executing this operation, it is necessary for a processor to execute the operation across each of these dimensions by performing a multiple-accumulate operation (MAC), the result of which is then written into an accumulator (e.g. an accumulator buffer in hardware). Having operated through all of these dimensions, the 2D convolution is completed and the contents of the accumulator therefore represents the result of the 2D convolution operation across the entire dimensionality of operation.

```
for (output channel)
  for (batch N)
    for (output Y)
      for (output X)
        for (input channel)
          for (kernel Y)
            for (kernel X)
              MAC
              write accumulator
```

The inventors have recognized that the seven dimensions of the convolution operation can collectively be used to define the 'operation space' in which the 2D convolution operation is to be performed. More specifically, the sizes of each dimension can be used to define an effective "bounding box" defining the size of the operation space upon which the operation is to be performed. To illustrate this in more detail, consider an example where a 3×3 (i.e. KX=3; KY=3) convolution operation having padding is to be performed on input data having dimension IX=15; IY=15; N=1; and IC=32. This operation results in the following minimum and maximum index values representing the upper and lower bounds inclusive (i.e. the size) of the dimensionality of the convolution operation as shown in Table 1:

TABLE 1

|     | OC | N | OY | OX | IC | KY | KX |
|-----|----|----|----|----|----|----|----|
| Min | 0  | 0 | 0  | 0  | 0  | 0  | 0  |
| Max | 63 | 0 | 14 | 14 | 31 | 2  | 2  |

The output of the 2D convolution operation would have dimensions N=1; OY=15; OX=15; OC=64. These values represent the size of the output of the 2D convolution operation but they do not alone wholly represent the size of the operation required to generate that output. To wholly represent the operation space of the operation, all of the dimensions of the operation are required as shown in the above table. A shorthand representation for the dimensions of the 2D convolution operation is [OC N OY OX IC KY KX] and in this specific example can be presented as the minimum and maximum index values as illustrated in the example above i.e. [64 1 15 15 32 3 3].

Operations such as the convolution operation described above can be separated into blocks, each block representing a subset of the dimensions of the operation. In the example below, the 2D convolution of Table 1 is separated into multiple blocks by breaking up the operation in the OY, OX, and IC dimensions. Breaking the operation into blocks involves separating the operation space of the operation into multiple blocks which each individually represent a portion of the operation but collectively represent the operation space. This block generation involves separating the operation space into sub-blocks representing a non-overlapping subset of the dimensions in the operation space which wholly cover the operation space dimensions (e.g. the set of nested for-loops shown above). In an example where the operation is to be separated into a number of blocks, the operation space is broken down into sub-blocks based upon a pre-determined block-size which defines for each dimension of the operation a fixed size. This fixed size block is referred to herein as a block quantum. In the example below, the block size is as follows:

TABLE 2

|       | OC | N | OY | OX | IC | KY | KX |
|-------|----|----|----|----|----|----|----|
| Block quantum | 16 | 1 | 8 | 8 | 16 | 3 | 3 |

In the block size above, the operation space is broken up by separating four of the seven dimensions of the operation in two. In the examples below, OY, OX, and IC have been separated into two, while OC has been separated into four. The following blocks illustrate a portion of the blocks that wholly represent the operation space (with only a first quarter of the OC dimension being represented):

TABLE 3

|          | OC | N | OY | OX | IC | KY | KX |
|----------|----|----|----|----|----|----|----|
| Block #0 |    |   |    |    |    |    |    |
| Min      | 0  | 0 | 0  | 0  | 0  | 0  | 0  |
| Max      | 15 | 0 | 7  | 7  | 15 | 2  | 2  |
| Block #1 |    |   |    |    |    |    |    |
| Min      | 0  | 0 | 0  | 0  | 16 | 0  | 0  |
| Max      | 15 | 0 | 7  | 7  | 31 | 2  | 2  |
| Block #2 |    |   |    |    |    |    |    |
| Min      | 0  | 0 | 0  | 8  | 0  | 0  | 0  |
| Max      | 15 | 0 | 7  | 14 | 15 | 2  | 2  |
| Block #3 |    |   |    |    |    |    |    |
| Min      | 0  | 0 | 0  | 8  | 16 | 0  | 0  |
| Max      | 15 | 0 | 7  | 14 | 31 | 2  | 2  |
| Block #4 |    |   |    |    |    |    |    |
| Min      | 0  | 0 | 8  | 0  | 0  | 0  | 0  |
| Max      | 15 | 0 | 14 | 7  | 15 | 2  | 2  |
| Block #5 |    |   |    |    |    |    |    |
| Min      | 0  | 0 | 8  | 0  | 16 | 0  | 0  |
| Max      | 15 | 0 | 14 | 7  | 31 | 2  | 2  |
| Block #6 |    |   |    |    |    |    |    |
| Min      | 0  | 0 | 8  | 8  | 0  | 0  | 0  |
| Max      | 15 | 0 | 14 | 14 | 15 | 2  | 2  |
| Block #7 |    |   |    |    |    |    |    |
| Min      | 0  | 0 | 8  | 8  | 16 | 0  | 0  |
| Max      | 15 | 0 | 14 | 14 | 31 | 2  | 2  |

For a given block of the operation space, e.g. [OC N OY OX IC KY KX], it is possible to determine which input feature map coordinates are required to perform the operation for that block. In the example of the 2D convolution operation, the input feature map coordinates (and other input parameters) upon which the output feature map coordinates depend can be defined as the below (stride X, Y=1 (i.e. no striding); dilation X, Y=1 (i.e. no dilation) and top, left pad=1 (i.e. the input is padded):

N=N; (wherein N is batch number);
IY=(OY*(Stride Y))+((Dilation Y)*KY)−Top Pad;
IX; (OX*(Stride X))+((Dilation X)*KX)−Left Pad; and
IC=IC;

Where Stride X and Stride Y, Dilation X, and Dilation Y represent the respective stride and dilation values in X and Y dimensions when executing the convolution operation, and where Top Pad and Left Pad represent respective top and left padding values when executing the operation. When the above relationships are simplified for stride and dilation values of 1 with zero padding, this can more simply be expressed as [N, OY+KY−1, OX+KX−1, IC]. These expressions for calculating the input feature maps for processing a block can be represented as an affine transform as set out below in table 4:

TABLE 4

|    | OC | N | OY | OX | IC | KY | KX | Offset |
|----|----|----|----|----|----|----|----|--------|
| N  |    | 1 |    |    |    |    |    |        |
| IY |    |   | 1  |    |    | 1  |    | −1     |
| IX |    |   |    | 1  |    |    | 1  | −1     |
| IC |    |   |    |    | 1  |    |    |        |
|    |    |   |    |    |    |    |    | 1      |

For a given block in operation space it is therefore possible to express a transform (an affine or semi-affine transform) to transform the block to determine the input feature map coordinate ranges needed for performing the operation as defined by the block. In the example of the above affine transform being applied to Block #2, the resultant input range of input feature map indexes can be shown to be as below in Table 5:

TABLE 5

|    | Min | Max |
|----|-----|-----|
| N  | 0   | 0   |
| IY | −1  | 8   |
| IX | 7   | 15  |
| IC | 0   | 15  |

The affine transform defined above can be used to separately represent the transforms required to define each of the input feature map (as set out above), the output feature map, and the weights. General examples of each of input feature map, output feature map, and weight transforms is set out in Tables 6 to 8 below:

TABLE 6

Input transform for 2D convolution

| IFM | OC | N | OY | OX | IC | KY | KX | Offset |
|-----|----|----|----|----|----|----|----|--------|
| N   |    |   |    |    |    |    |    |        |
| IY  |    |   | Stride Y |  |  | Dilation Y |  | −Top Pad |
| IX  |    |   |    | Stride X |  |  | Dilation X | −Left Pad |
| IC  |    |   |    |    | 1  |    |    |        |
|     |    |   |    |    |    |    |    | 1      |

TABLE 7

Weight transform for 2D convolution

| Weights | OC | N | OY | OX | IC | KY | KX | Offset |
|---------|----|----|----|----|----|----|----|--------|
| OC      | 1  |   |    |    |    |    |    |        |
| KY      |    |   |    |    |    | 1  |    |        |
| KX      |    |   |    |    |    |    | 1  |        |
| IC      |    |   |    |    | 1  |    |    |        |
|         |    |   |    |    |    |    |    | 1      |

TABLE 8

Output transform for 2D convolution

| OFM | OC | N | OY | OX | IC | KY | KX | Offset |
|---|---|---|---|---|---|---|---|---|
| N   |    | 1 |    |    |    |    |    |   |
| OY  |    |   | 1  |    |    |    |    |   |
| OX  |    |   |    | 1  |    |    |    |   |
| OC  | 1  |   |    |    |    |    |    |   |
|     |    |   |    |    |    |    |    | 1 |

It will be appreciated therefore that the operation space defines the dimensionality of the operations to be performed when executing a particular operation. The above examples are provided in respect of a 2D convolution but the concept is applicable to all types of operation that is to be performed. For example, similar transforms for the input and output of a transpose operation (e.g. transposing dimensions {0,1,3, 2}) can be derived as set out below:

TABLE 9

Input transform for {0, 1, 3, 2} transpose

| Input | Dim 0 | Dim 1 | Dim 2 | Dim 3 | Offset |
|---|---|---|---|---|---|
| Dim 0 | 1 |   |   |   |   |
| Dim 1 |   | 1 |   |   |   |
| Dim 2 |   |   |   | 1 |   |
| Dim 3 |   |   | 1 |   |   |
|       |   |   |   |   | 1 |

TABLE 10

Output transform for {0, 1, 3, 2} transpose

| Output | Dim 0 | Dim 1 | Dim 2 | Dim 3 | Offset |
|---|---|---|---|---|---|
| Dim 0 | 1 |   |   |   |   |
| Dim 1 |   | 1 |   |   |   |
| Dim 2 |   |   | 1 |   |   |
| Dim 3 |   |   |   | 1 |   |
|       |   |   |   |   | 1 |

Utilising the input transform on the input allows the swapping of dimensions 2 and 3 in the input transform matrix to perform the transpose operation. More generally, the input and output matrices can then be applied to a block in operation space to determine a range of values for the input and output of that operation. These determined ranges of values represent the local section space for that operation, which forms a local coordinate system on which that operation can be executed for that block of the operation space.

When considering the graph data structure described above in respect of FIG. 1a, the operation performed in each section of the graph can be defined by the set of input and output transform matrices for that operation. It is therefore possible to represent at least a portion of the acyclic graph by a chain of operations that correspond to a chain of sections each connected by pipes. In addition, an operation space for a chain of operations can be established.

Hardware Implementation

As described above, a data structure in the form of a directed acyclic graph may comprise plural sequenced operations that are connected to one another for execution in a chain. Other data structures in the form of different graphs may also be represented. Described below is an example hardware arrangement for executing chained operations for at least a portion of the directed acyclic graph as illustrated in FIG. 1a, although it will be appreciated that the example hardware arrangement used for executing chained operations for any type of graph.

Figure 1B:
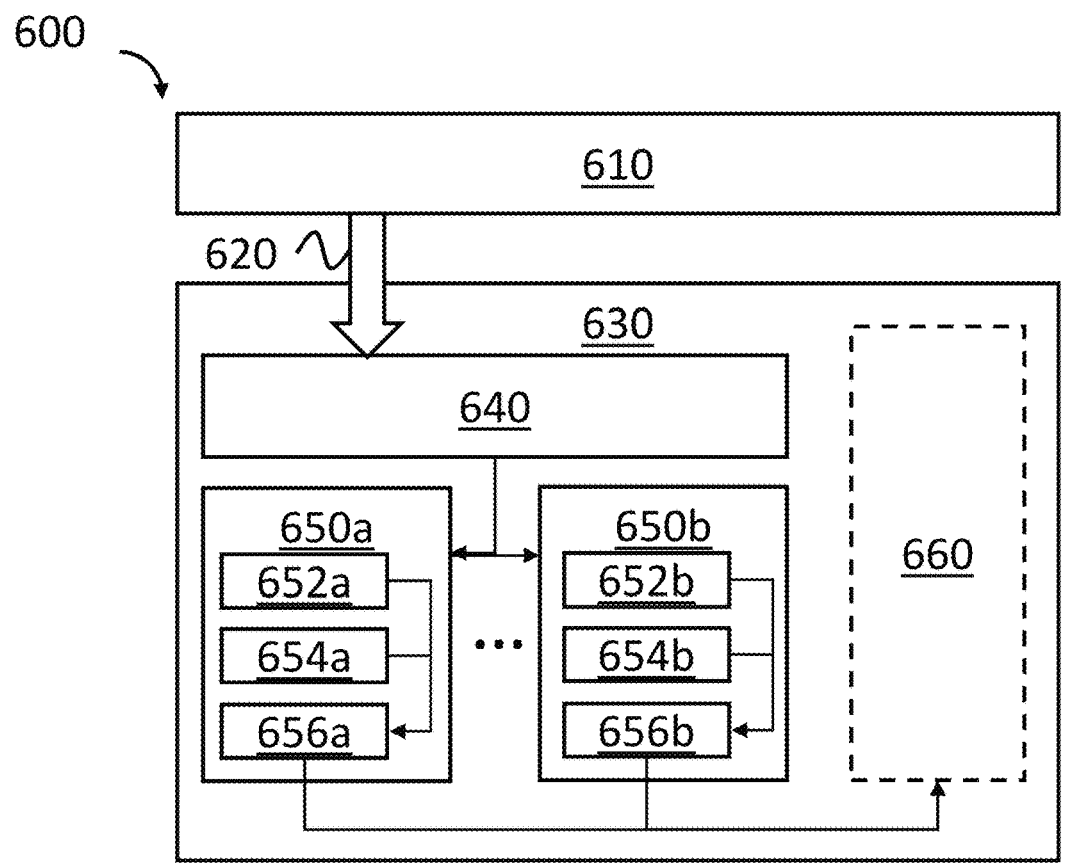
FIG. 1b illustrates schematically an example of a data processing system according to the present disclosure.

FIG. 1b shows schematically an example of a data processing system 600 including processor 630 which may act as a co-processor or hardware accelerator unit for a host processing unit 610. It will be appreciated that the types of hardware accelerator which the processor 630 may provide dedicated circuitry for is not limited to that of Neural Processing Units (NPUs) or Graphics Processing units (GPUs) but may be dedicated circuitry for any type of hardware accelerator. GPUs may be well-suited for performing certain types of arithmetic operations such as neural processing operations, as these operations are generally similar to the arithmetic operations that may be required when performing graphics processing work (but on different data formats or structures). Furthermore, GPUs typically support high levels of concurrent processing (e.g. supporting large numbers of execution threads), and are optimized for data-plane (rather than control plane) processing, all of which means that GPUs may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable, to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, the processor 630 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor, this means that the machine learning processing circuit is preferably then operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 1b, the processor 630 is arranged to receive a command stream 620 from a host processor 610, such as a central processing unit (CPU). The command stream comprises at least one command in a given sequence, each command to be executed, and each command may be decomposed into a number of tasks, such as tasks discussed in this document. These tasks may be self-contained operations, such as a given machine learning operation or a graphics processing operation. It will be appreciated that there may be other types of tasks depending on the command.

The command stream 620 is sent by the host processor 610 and is received by a command processing unit 640 which is arranged to schedule the commands within the command stream 620 in accordance with their sequence. The command processing unit 640 is arranged to schedule the commands and decompose each command in the command stream 620 into at least one task. Once the command processing unit 640 has scheduled the commands in the command stream 620, and generated a plurality of tasks for the commands, the command processing unit issues each of the plurality of tasks to at least one compute unit 650a, 650b each of which are configured to process at least one of the plurality of tasks.

The processor 630 comprises a plurality of compute units 650a, 650b. Each compute unit 650a, 650b, may be a shader core of a GPU specifically configured to undertake a number of different types of operations, however it will be appreciated that other types of specifically configured processor may be used, such as a general-purpose processor configured with individual compute units, such as compute units 650a, 650b. Each compute unit 650a, 650b comprises a number of components, and at least a first processing module 652a, 652b for executing tasks of a first task type, and a second processing module 654a, 654b for executing tasks of a second task type, different from the first task type. In some examples, the first processing module 652a, 652b may be a processing module for processing neural processing operations, such as those which would normally be undertaken by a separate NPU. In these cases, the first processing module 652a, 652b is for example a neural engine. Similarly, the second processing module 654a, 654b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the first processing module 652a, 652b of a given compute unit 650a, 650b, and tasks of a second task type to the second processing module 654a, 354b of a given compute unit 650a, 650b. The command processing unit 640 would issue machine learning/neural processing tasks to the first processing module 652a, 652b of a given compute unit 650a, 650b where the first processing module 652a, 652b is optimized to process neural network processing tasks, for example by comprising an efficient means of handling a large number of multiply-accumulate operations. Similarly, the command processing unit 640 would issue graphics processing tasks to the second processing module 654a, 654b of a given compute unit 650a, 650b where the second processing module 652a, 654a is optimized to process such graphics processing tasks. In some examples, the first and second may both be neural processing tasks issued to a first processing module 652a, 652b, which is a neural engine. Such a neural processing task may involve the processing of a tensor, e.g. representing a feature map, with weights associated with a layer of a neural network.

In addition to comprising a first processing module 652a, 652b and a second processing module 654a, 654b, each compute unit 650a, 650b also comprises a memory in the form of a local cache 656a, 656b for use by the respective processing module 652a, 652b, 654a, 654b during the processing of tasks. Examples of such a local cache 656a, 656b is a L1 cache. The local cache 656a, 656b may, for example, a synchronous dynamic random-access memory (SDRAM). For example, the local cache 656a, 656b may comprise a double data rate synchronous dynamic random-access memory (DDR-SDRAM). It will be appreciated that the local cache 656a, 656b may comprise other types of memory.

The local cache 656a, 656b is used for storing data relating to the tasks which are being processed on a given compute unit 650a, 650b by the first processing module 652a, 652b and second processing module 654a, 654b. It may also be accessed by other processing modules (not shown) forming part of the compute unit 650a, 650b the local cache 656a, 656b is associated with. However, in some examples, it may be necessary to provide access data associated with a given task executing on a processing module of a given compute unit 650a, 650b to a task being executed on a processing module of another compute unit (not shown) of the processor 630. In such examples, the processor 630 may also comprise storage 660, for example a cache, such as an L2 cache, for providing access to data use for the processing of tasks being executed on different compute units 650a, 650b.

By providing a local cache 656a, 656b tasks which have been issued to the same compute unit 650a, 650b may access data stored in the local cache 656a, 656b, regardless of whether they form part of the same command in the command stream 620. The command processing unit 640 is responsible for allocating tasks of commands to given compute units 650a, 650b such that they can most efficiently use the available resources, such as the local cache 656a, 656b, thus reducing the number of read/write transactions required to memory external to the compute units 650a, 650b, such as the storage 660 (L2 cache) or higher level memories. One such example, is that a task of one command issued to a first processing module 652a of a given compute unit 650a, may store its output in the local cache 656a such that it is accessible by a second task of a different (or the same) command issued to a given processing module 652a, 654a of the same compute unit 650a.

One or more of the command processing unit 640, the compute units 650a, 650b, and the storage 660 may be interconnected using a bus. This allows data to be transferred between the various components. The bus may be or include any suitable interface or bus. For example, an ARM® Advanced Microcontroller Bus Architecture (AMBA®) interface, such as the Advanced extensible Interface (AXI), may be used.

Figure 2:
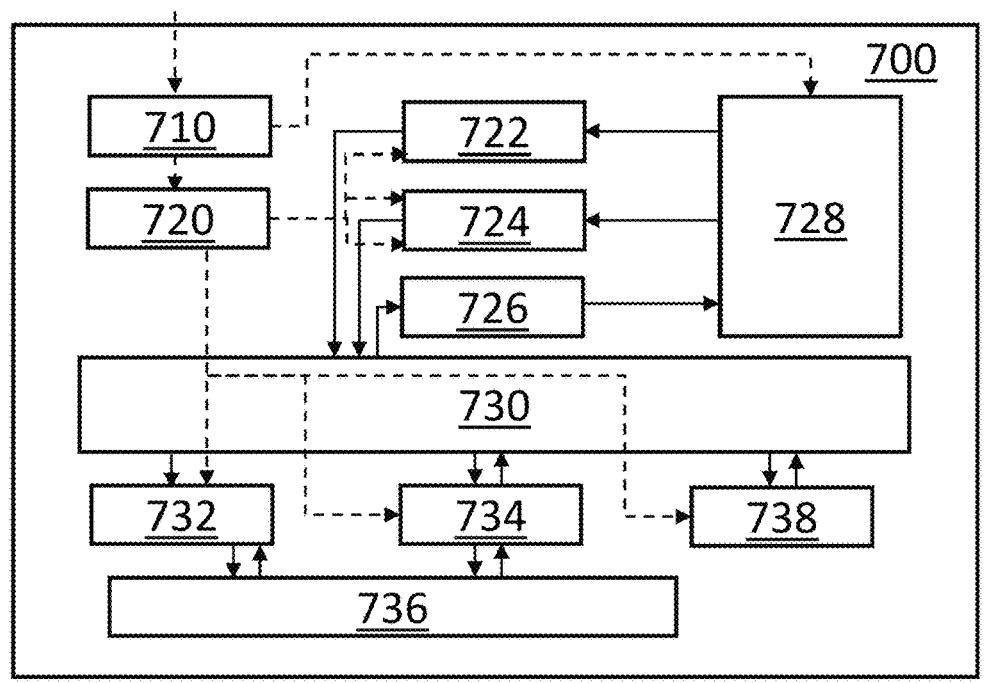
FIG. 2 illustrates a schematic diagram of a neural engine according to the present disclosure.

FIG. 2 is a schematic diagram of a neural engine 700, which in this example is used as a first processing module 652*a*, 652*b* in a data processing system 600 in accordance with FIG. 1*b*. The neural engine 700 includes a command and control module 710. The command and control module 710 receives tasks from the command processing unit 640 (shown in FIG. 1*b*), and also acts as an interface to storage external to the neural engine 700 (such as a local cache 656*a*, 656*b* and/or a L2 cache 660) which is arranged to store data to be processed by the neural engine 700 such as data representing a tensor, or data representing a stripe of a tensor. The external storage may additionally store other data to configure the neural engine 700 to perform particular processing and/or data to be used by the neural engine 700 to implement the processing such as neural network weights.

The command and control module 710 interfaces to a handling unit 720, which is for example a traversal synchronization unit (TSU). In this example, each task corresponds to a stripe of a tensor which is to be operated upon in accordance with a sequence of operations according to at least a portion (e.g. a sub-graph) of the acyclic graph representation of the neural network. The tensor for example represents a feature map for processing using the neural network. A neural network typically includes a sequence of layers of processing, with an output from each layer being used as an input to the next layer. Each layer for example processes an input feature map by operating upon the input feature map to generate an output feature map, which is used as the input feature map for the next layer. The term "feature map" is used generically herein to refer to either an input feature map or an output feature map. The processing performed by a given layer may be taken to correspond to an operation.

In this example, the handling unit 720 splits data representing a stripe of a feature map into a plurality of blocks of data, each of which represents a respective part of the feature map. The handling unit 720 also obtains, from storage external to the neural engine 700 such as the L2 cache 660, task data defining operations selected from an operation set comprising a plurality of operations. In this example, the operations are structured as a chain of operations representing a sequence of layers of the neural network. A block of data is allocated as an input to one of the operations by the handling unit 720.

The handling unit 720 coordinates the interaction of internal components of the neural engine 700, which include a weight fetch unit 722, an input reader 724, an output writer 726, a direct memory access (DMA) unit 728, a dot product unit (DPU) array 730, a vector engine 732, a transform unit 734, an accumulator buffer 736, and a storage 738, for processing of blocks of data. The data dependencies across the functional units are tracked by the handling unit 720. Processing is initiated by the handling unit 720 in a functional unit if all input blocks are available and space is available in the storage 738 of the neural engine 700. The storage 738 may be considered to be a shared buffer, in that various functional units of the neural engine 700 share access to the storage 738.

In the context of a directed acyclic graph representing the operations to be performed, each of the internal components that operates upon data can be considered to be one of two types of component. The first type of component is an execution unit (and is identified within the neural engine 700 as such) that maps to a section that performs a specific instance of an operation within the acyclic graph. For example, the weight fetch unit 722, input reader 724, output writer 726, dot product unit array 730, vector engine 732, transform unit 734 each are configured to perform one or more pre-determined and fixed operations upon data that it receives. Each of these sections can be uniquely identified with an identifier and each execution unit can also be uniquely identified.

Similarly, all physical storage elements within the neural engine (and in some instances portions of those physical storage elements) can be considered to be uniquely identified within the neural engine. The connections between sections in the acyclic graph representing the neural network are also referred to as pipes within the context of the acyclic graph. These pipes can also be mapped to the uniquely identified physical storage elements in the neural engine. For example, the accumulator buffer 736 and storage 738 (and portions thereof) can each be regarded as a storage element that can act to store data for a pipe within the acyclic graph. The pipes act as connections between the sections (as executed by execution units) to enable a sequence of operations as defined in the acyclic graph to be chained together within the neural engine 700. Put another way, the logical dataflow of the acyclic graph can be mapped to the physical arrangement of execution units and storage elements within the neural engine 700. Under the control of the handling unit 720, execution can be scheduled on the execution units and data can be passed between the execution units via the storage elements in accordance with the mapping, such that the chained operations of a graph can be executed without needing to write data memory external to the neural engine 700 between executions. The handling unit 720 is configured to control and dispatch work representing performing an operation of the graph on at least a portion of the data provided by a pipe.

The weight fetch unit 722 fetches weights associated with the neural network from external storage and stores the weights in the storage 738. The input reader 724 reads data to be processed by the neural engine 700 from external storage, such as a block of data representing part of a tensor. The output writer 726 writes data obtained after processing by the neural engine 700 to external storage. The weight fetch unit 722, input reader 724 and output writer 726 interface with the external storage (which is for example the local cache 656*a*, 656*b*, which may be a L1 cache such as a load/store cache) via the DMA unit 728.

Data is processed by the DPU array 730, vector engine 732 and transform unit 734 to generate output data corresponding to an operation in the acyclic graph. The result of each operation is stored in a specific pipe within the neural engine 700. The DPU array 730 is arranged to perform one or more operations associated with a dot product operation between two operands, such as between an array of weights and a corresponding block of data (e.g. representing part of a tensor). The vector engine 732 is arranged to perform elementwise operations, for example to apply scale parameters to scale an output of a dot product calculated by the DPU array 730. Data generated during the course of the processing performed by the DPU array 730 and the vector engine 732 may be transmitted for temporary stage in the accumulator buffer 736 which acts as a pipe between the previous operation and the subsequent operation, from where it may be retrieved by either the DPU array 730 or the vector engine 732 (or another different execution unit) for further processing as desired.

The transform unit 734 is arranged to perform in-block transforms such as dimension broadcasts or axis swaps. The transform unit 734 obtains data from a pipe, such as storage 738 (e.g. after processing by the DPU array 730 and/or vector engine 732), and writes transformed data back to the storage 738.

To make efficient use of the storage 738 available within the neural engine 700, the handling unit 720 determines an available portion of the storage 738, which is available during execution of part of a first task (e.g. during processing of a block of data associated with the first task by the DPU array 730, vector engine 732 and/or transform unit 734). The handling unit 720 determines a mapping between at least one logical address associated with data generated during execution of a second task (e.g. by processing of a block of data associated with the second task by the DPU array 730, vector engine 732 and/or transform unit 734) and at least one physical address of the storage 738 corresponding to the available portion. The logical address is for example a global address in a global coordinate system. Hence, by altering the physical address corresponding to a given logical address, the handling unit 720 can effectively control usage of the storage 738 without requiring a change in software defining the operation to be performed, as the same logical address can still be used to refer to a given element of the tensor to be processed. The handling unit 720 identifies the at least one physical address corresponding to the at least one logical address, based on the mapping, so that data associated with the logical address is stored in the available portion. The handling unit 720 can perform the mapping process according to any of the examples herein.

It will be appreciated that in a graph of operations there does not need to be only a single instance of a particular type of operation. For example, multiple instances of a convolution operation could be present in a graph of operations. In the above example hardware arrangement only a single convolution engine may be present. Therefore, it will be appreciated that there does not need to be a direct 1:1 mapping between operations in the graph (sections) and execution units, and similarly no direct 1:1 mapping between pipes and storage elements. In particular, a single execution unit may be configured at different instances in time to execute different instances of a convolution operation (e.g. first and second sections). Similarly, the input reader may be required to read data as part of different sections in the graph. The same can be said for storage elements and pipes.

All storage in the neural engine 700 may be mapped to corresponding pipes, including look-up tables, accumulators, etc. Some storage may be relatively fixed purpose, for example, if the hardware were limited to one convolution operation per graph the accumulator buffer might also be limited to being mapped to one pipe, and scale/bias/shift buffer might be limited to being mapped to one pipe; however both would likely be double buffered. If the neural engine supports 2 look-up tables (LUTs), then a maximum of 2 pipes could be used to target the LUTs to avoid needing to thrash the LUT storage; LUT pipes might then be single buffered. All other pipes could be mapped to a common Shared Buffer (or portions thereof) with fewer restrictions. Width and height of pipe can also be programmable, resulting a highly configurable mapping between pipes and storage elements within the neural engine 700.

Ordering of execution of the sections is implied by dependencies on inputs. A memory load operation has no data dependencies (unless it is a gather operation), so is implicitly early in the graph. The consumer of the pipe the memory read produces is implicitly after the memory read. A memory store operation is near the end of the graph, as it produces no pipes for other operations to consume. The sequence of execution of a chain of operations is therefore handled by the handling unit 720 as will be explained in more detail later.

Figure 3:
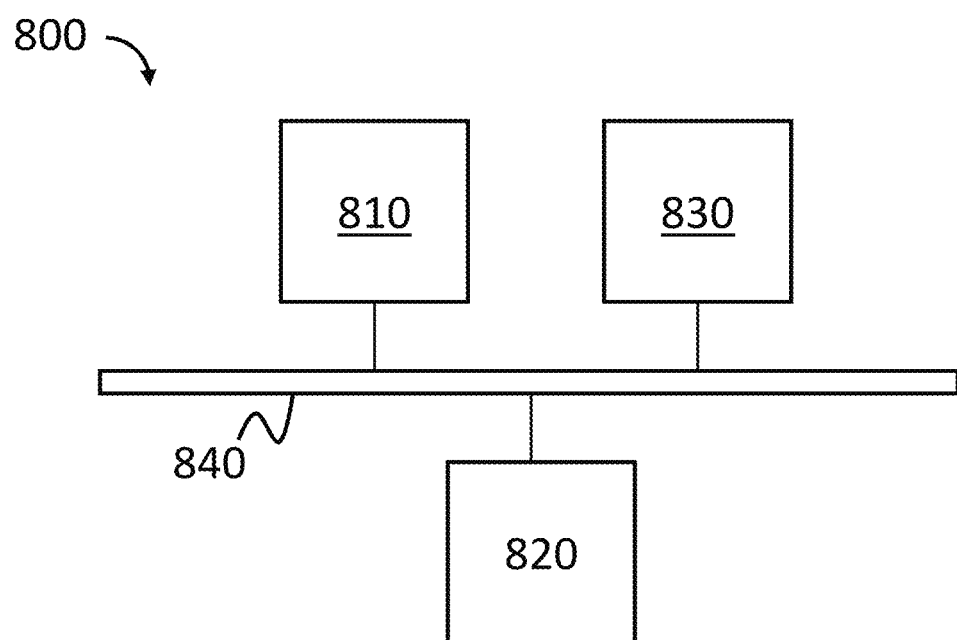
FIG. 3 illustrates schematically an example system for allocating handling data according to the present disclosure.

FIG. 3 shows schematically a system 800 for allocating handling data, and in some examples generating a plurality of blocks of input data for processing.

The system 800 comprises host processor 810 such as a central processing unit, or any other type of general processing unit. The host processor 810 issues a command stream comprising a plurality of commands, each having a plurality of tasks associated therewith.

The system 800 also comprises a processor 830, which may be similar to or the same as the processor 630 of FIG. 1b, and may comprise at least some of the components of and/or be configured to perform the methods described above. The processor 830 comprises at least a plurality of compute units 650a, 650b and a command processing unit 640. Each compute unit may comprise a plurality of processing modules each configured to perform at least one type of operation. The system 800 may also include at least one further processor (not shown), which may be the same as the processor 830. The processor 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 650a, 650b of a processor 830 so as to maximize the usage of the local cache 656a, 656b.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory'. The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processor 810, the processor 830, and the memory 820 may be interconnected using a system bus 840. This allows data to be transferred between the various components. The system bus 840 may be or include any suitable interface or bus. For example, an ARM® Advanced Microcontroller Bus Architecture (AMBA®) interface, such as the Advanced extensible Interface (AXI), may be used.

Neural Engine Program Descriptor (NED)

The neural engine 700 receives tasks from the command processing unit 640 to execute operations from a graph, such as the directed acyclic graph described above with reference to FIG. 1a. The neural engine 700 is configured to execute operations selected from a base set of operations defining an operator set. One example of such an operator set is the Tensor Operator Set Architecture (TOSA) base inference profile, which defines a set of operations that can collectively be used to define the operations of a wide range of neural network operations. One exception to the TOSA operator set is control flow operations that may be implemented by way of a command stream processed by the command processing unit 640. It will be appreciated that there may be multiple neural engines with the processor 630 and thus multiple tasks can be issued concurrently to different neural engines.

In an example implementation, a task issued by the command processing unit 640 for execution by the neural engine 700 is described by task data which in this example is embodied by a neural engine program descriptor (NED), which is a data structure stored in memory and retrieved by the neural engine when executing the task issues by the command processing unit. The NED describes at least a portion of a complete graph of operations (sections) to be performed when executing the graph of operations (e.g. representing a neural network). As discussed above, sections are mapped to various hardware execution units within the neural engine 700 and essentially represent instantiations of a particular operator at a position within the graph. In one example, these sections are described by specific 'elements' that collectively define the operations forming part of the NED. An example NED comprises a NED structure comprising a header, the elements each corresponding to a section in the graph. The NED describes the various requirements of ordering, number and relationship of these sections and pipes. In one implementation, each of the execution units and each storage element (or portion of a storage element) of the neural engine 700 has a sub-descriptor definition which defines how that execution unit/storage element can be configured for use in implementing a specific section or pipe in the graph. An example of the hardware units and their corresponding elements is set out below:

Weight Fetch (WF): NEDWeightFetchElement
Input Reader (IR): NEDInputReaderElement
Output Writer (OW): NEDOutputWriterElement
Convolution Engine (CE): NEDConvolutionEngineElement
Transform Unit (TU): NEDTransformUnitElement
Vector Engine (VE): NEDVectorEngineElement The dataflow and dependencies of the task's graph is described by pipes, which are described in another element as part of the NED: NEDPipeElement. Pipes are used to represent data storage elements within the neural engine 700 and describe the relationship between sections (operations) in a producer-consumer relationship: the output destination pipe (e.g. a pipe number) and each input source pipe (e.g. a pipe number) for every section is defined in the NED elements of the NED. A pipe has only a single producer, but may have multiple consumers. A pipe may be mapped to one of several different locations (e.g storage elements in the neural engine 700), but not all locations may be suitable for the different section operations. It will be appreciated that, in some arrangements, a pipe may be mapped to only a portion of a storage element—e.g. a number of physical buffers, allowing it to describe double-buffering (for example) behavior between its producer and consumers. The output data generated by a section and stored in a pipe is referred to equivalently as both a block (of data) and a (virtual) buffer, with a block of data occupying one physical buffer location. Irrespective of location, pipes may be non-coherent with a wider memory system associated with the neural engine 700 and with processor 630, and data is stored out using the Output Writer element of the neural engine 700.

In some arrangements the NED may be configured such that the same pipe is used for multiple inputs, where any relevant usage constraints (such as format or location) are satisfied. For example, an element-wise multiply might have the same pipe for the two input operands in order to square the input.

For a section to run, it must have all the appropriate buffers available for its input source pipes. A section may produce a new buffer in its output destination pipe and so there must be space available in the pipe for this new buffer. In the case of a reduction operation (convolution, for example), a section may repeatedly read back and update the previous buffer it generated. As a result, for a reduction operation there is a distinction between the reduction operation having first generated the output buffer and the reduction having completed and the output buffer being fully available, due to this update process. Put another way, there is a point in time at which the output buffer exists in the input pipe of a subsequent operation, but it is not yet ready to be consumed by the subsequent operation. The neural engine 700 is responsible for tracking all of these dependencies, in which buffers are tracked like FIFO entries, but with buffers only available for consumers when a producer has completed any sequence of reductions, and with buffers only freed up when all consumers have completed operations dependent on them.

A task's graph has a directed acyclic dataflow. In this way, in this example it is not legal to use an input pipe as the destination pipe in the same section, or to have any form of loop within the graph. Note that reduction operations will both read from and write to their output destination pipe's buffer, but this is still acyclic behavior; for example, the convolution engine may repeatedly accumulate into the same accumulator buffer.

In this example implementation, the neural engine is stateless between tasks: all control state is encapsulated in the task's NED, and all data is encapsulated in the pipes defined by the NED. There is no sharing of pipes between tasks and therefore no architected sharing of data between tasks within the neural engine 700. Data reuse and sharing is achieved only through memory by use of the Output Writer in a preceding task and the Input Reader in a later task. The neural engine will cache memory descriptors, including the NED, between tasks; this cache is invalidated each time a complete neural workload is completed (e.g. the total neural network and not just the sub-graph associated with a specific task). However, it will be appreciated that this is just an example implementation.

The NED is split into multiple data structures that may appear contiguously in memory to be read by the neural engine 700. In this example implementation, the NED header defines the dimensions of the operation space of the operations to be performed. Specifically, the NED header defines the total size of the NED (e.g. number of bytes to used to represent the NED) as well as a count of the number of section and pipes that are present in the graph.

For each section and pipe in the graph, a count of a corresponding mapped sub-descriptor element types is represented in the NED header. For instance, where the graph (or sub-graph) contains a number of sections, each of those sections is to be executed on a particular compatible execution unit of the neural engine 700. For each section, an element of the appropriate type is therefore counted in the NED header in order to represent the hardware requirements needed to invoke execution of the graph. For example, for a section that defines a convolution operation, a corresponding configuration and invocation of a convolution engine execution unit would be required. Similar counts of instantiations of weight fetch and input read execution units is counted based on the presence of sections that use those operations. This is reflected in the count in the NED header against the weight fetch and input reader elements associated with the weight fetch and input reader units in the neural engine 700.

The NED also contains information that describes any divergent or convergent branches between sections and pipes. For example the NED identifies, for each pipe in the graph, the number of producers and consumers associated with that pipe.

The NED header therefore essentially identifies the operation space and a count of all instances of sections and pipes (for each type of hardware element that is to be allocated for instantiating a section or a pipe that will be required to execute the graph (or sub-graph)) defined by the NED. An illustrative example of at least a portion of the fields stored in the NED header is set out below. In addition to the NED header, the NED further comprises sub-descriptor elements (defining either the configuration of an execution unit or storage element to operate as a section or pipe) for each instance of a section and/or pipe. Each sub-descriptor element defines the configuration of the associated hardware element (either execution unit or storage element) required to execute the section and/or pipe.

An example of at least some of the fields in a NED header is set out below:

| Field | Min | Max |
| --- | --- | --- |
| Operation space size for dimension 1 | — | — |
| Operation space size for dimension 2 | — | — |
| Operation space size for dimension 3 | — | — |
| Operation space size for dimension 4 | — | — |
| Operation space size for dimension 5 | — | — |
| Operation space size for dimension 6 | — | — |
| Operation space size for dimension 7 | — | — |
| Number of weight fetch and decode sections | 0 | 1 |
| Number of input reader sections | 1 | 7 |
| Number of output write sections | 1 | 7 |
| Number of convolution engine sections | 0 | 1 |
| Number of transform unit sections | 0 | 7 |
| Number of vector engine sections | 0 | 7 |
| Number of pipes | 1 | 15 |

The theoretical minimum and maximum operation space dimension sizes may be defined at compilation based on the configuration of the neural engine, specifically such that the operations of the task (e.g. sub-graph) can be performed without requiring intermediate data to be stored in a memory element outside of the neural engine. A practical approach to defining a task and its corresponding operation space is set out in more detail later.

The NED header may also comprise pointers to each of the sub-descriptor elements to enable the specific configuration of each element to be read by the handling unit 720.

As mentioned, each instance of the sub-descriptor element defines a configuration of the hardware element (e.g. execution unit or storage element) to which it relates. The following description will provide an example sub-descriptor for a convolution engine.

In an example, the convolution engine is an execution unit which is configured, when invoked, to perform a convolution or pooling operation selected from one or more convolution operations for which the convolution engine is configured. One such examples is a 2D convolution operation as described above. In the example of the 2D convolution operation described above, the operation space is 7D—namely [oc, n, oy, ox, ic, ky, kx].
  Field
  Stride X and Stride Y
  Dilation X and Dilation Y
  Operation type (e.g. which type of convolution operation is to be performed)
  Input width and height
  Pad Left
  Pad Top
  Source 0 pipe (input feature map pipe)
  Source 1 pipe (weight pipe)
  Destination pipe In this example, the operation type may for example take the form of one of pooling (average or max pooling), 2D convolution, or 2D depth-wise convolution. The source 0 pipe field might identify from which pipe the convolution engine should read the input feature map data—this may for example be a specific portion of a shared buffer. Similarly the source 1 pipe field might indicate from which (different) portion of the shared buffer the weight data is to be retrieved. Finally, the destination pipe might indicate that an accumulation buffer is to act as the pipe for the output of the operation performed by the convolution engine. By identifying for a section specific source and/or destination pipes, which have unique identifiers in the task definition (the NED), any preceding or subsequent sections are implicitly connected and sequenced. Another sub-descriptor element referencing the destination pipe of a different section as a source pipe will inherently read that data and the buffer allocation for that destination pipe may only be released once all of the dependencies have been resolved (e.g. that the sections that rely on that portion of the accumulation buffer have all completed reading that data).

Similar sub-descriptor elements exist for all sections based on configuring the execution units to perform operations. For example, sub-descriptor elements may define destination and source pipes, a pointer to a transform from operation to section space, and a mode of operation for the section.

In this example implementation, pipes represent all storage within the neural engine: all allocation and memory management is handled through a task's NED Pipe definitions and the traversal through the sections that produce and consume these pipes. There is no sharing of pipes between tasks and therefore no architected sharing of data between tasks within the neural engine. A sub-descriptor element is defined in the NED for each pipe in the graph. An example of a pipe sub-descriptor is set out below:

| Field | Min | Max |
| --- | --- | --- |
| Pipe location (e.g. accumulator buffer, shared buffer, LUT memory) | 0 | 2 |
| Number of buffers occupied by the pipe | 1 | 16 |
| Starting bank in memory | 1 | 8 |
| Number of banks used by the pipe | 1 | 8 |
| Starting word | 0 | 255 |
| Number of words per buffer | 1 | 256 |

As will be described in more detail later, these descriptors are used to configure the hardware elements when invocation is triggered by the handling unit 720.

Neural Engine Dimensions and Iteration

Figure 4:
FIG. 4 illustrates a table showing data relating to a number of sections according to the present disclosure.

A neural engine task describes a 4D bounding box (dimensions #0-3) that should be operated on by the section operations of a graph defined by a NED that the task provides a pointer to. As well as describing the graph, the NED also defines a further four dimensions (dimensions #4-7), making for a total 8-dimension operation-space. The bounding box for the first four dimensions is a sub-region of the full size of these dimensions, with different tasks and/or jobs covering other sub-regions of these dimensions. As illustrated in FIGS. 4 and 5, the command processing unit 640 may issue different tasks to different neural engines. As such, the dimensions 0-3 when the NED is generated or at the point that the task is defined. The latter four dimensions are described in their entirety in the NED and are therefore covered entirely in each task. The NED additionally defines an increment size for each of these 8 dimensions to be stepped through, known as a block size. Execution of the graph against this 8D operation-space can be considered as a series of nested loops.

This splits the execution of the task's operation-space into a series of blocks, with sections being invoked on a block-by-block basis, operating on a block's worth of data in every source and destination pipe. Consequently, defining a general operation space in a coordinate system having for example eight dimensions may provide a low complexity pattern for execution of any task comprising operations on data, instead of relying on fixed functions per task type, which may encompass a significant risk of missing necessary combinations of patterns. By defining a common operation space in a coordinate space, it may be less complex to chain a plurality of operations to be executed on data to each other and coordinate execution of these functions. Operation space dimensions does not have a specific interpretation until they are projected into space for a specific task.

The number of dimensions in use is dependent on the graph and its operations; not every section will run for increments in each dimension. For example, a convolution operation has a 7D operation-space but only a 4D output space; a VE scaling operation following a convolution thus only runs for increments in the first four dimensions. This relationship is described by two variables, the number of operation-space dimensions triggering increments for each section, dims_inc_run (a "dimensions increment run" value), and the number of operation-space dimensions generating new blocks for each pipe, "dims_inc_buf" (a "dimensions increment buffer" value), both of which are encoded in their respective NED elements. Both fields are specified counting dimensions from the outer-most dimension #0 up to the inner-most dimension #7.

dims_inc_run specifies how many operation-space dimensions trigger invocations of the section when those dimensions increment in operation-space. Example usage of dims_inc_run is illustrated below:
- 0: the section is independent of the operation-space and will therefore only be invoked once for the task;
- 1: the section may depend on operation-space dimension #0, and is invoked for each operation-space step through dimension #0; and
- 8: the section may depend on all operation-space dimensions, and is invoked for each operation-space step.

dims_inc_buf specifies how many operation-space dimensions generate a new block in the pipe when those dimensions increment in the producer section, effectively defining how many blocks the pipe generates throughout the duration of the task;
- if the value of dims_inc_buf is k (where k>0), then pipe.blocks=dim[0].blocks*dim[1].blocks* . . . *dim[k−1].blocks;
- if the value of dims_inc_buf is k (where k==0), then the pipe only ever has a single block For simple operations, dims_inc_run will be equal to dims_inc_buf for all source input and output destination pipes, but for more complex operations, dims_inc_run may be greater.

Where dims_inc_run>dims_inc_buf:
- for a source pipe: this relationship between the fields indicates the reuse of a buffer through one or more operation-space dimensions, the difference between the two values specifying the number of reuse dimensions. In this context, reuse means that the data is broadcast through the extra dimensions: the buffer in the Neural Engine's internal memory is consumed multiple times. For example, the feature map input to a convolution operation is typically reused against the weight kernel x and y dimensions of the convolution engine.

Meanwhile, for a destination pipe, this relationship indicates the reduction of one or more operation-space dimensions' set of buffers, the difference between the two values specifying the number of reduction dimensions. In this context, reduction means that the data from the extra inner operation-space dimensions are accumulated in the smaller number of outer operation-space dimensions (with the section reading back and updating its output buffer over multiple invocations). For example, a vector block reduction operation will result in a smaller number of buffer increments.

Where a pipe has multiple consumers, there is no relationship between those consumers and no restriction or requirement on the value of dims_inc_run for a consumer with respect to other consumers.

In the examples described herein, the neural engine's handling unit is responsible for iterating through this 8D operation-space for each section described in the NED graph. The handling unit uses the two values, dims_inc_run and dims_inc_buf, to determine which increments are relevant and to correctly manage the dependencies between the sections and their pipes. Each section operates in its own local coordinate space, known as the section-space, and the handling is responsible for transforming each relevant operation-space block (relevant through an increment in a run dimension) into this section-space. In the examples described herein, this transformation may be programmatic and described with a small program in a specialized (or general purpose) ISA that is executed for each block before the section is invoked.

The handling unit may be synchronizing the execution of multiple different parts of these nested for-loops in parallel, and therefore needs to track where in the loop a function of a component should be invoked, and where in the loop, data that may be needed by subsequent components (based on the partially ordered set of data structures) is produced. To achieve this in a flexible way, which still allows for a straightforward hardware implementation, two types of dimensions are specified in each data structure.

In some embodiments, each data structure comprises N vectors of binary values indicating, for each of the N dimensions of the coordinates space, whether changes of coordinate in said dimensions while executing the task causes the function of the associated component to execute or not and causes the function of the associated component to store data in the storage or not (DIMS_INC_RUN). Effectively, this allows for the behavior of each component for each dimension is thus encoded as a multi-hot vector of behaviors. Behaviors may include for example reuse, recompute, reduce, output, unmapped/once.

In some types of tasks including operations on data, data is frequently "reused" multiple times over some number of dimensions. For example, in operations in a neural network, same weights may be applied to multiple elements in the Batch, X and Y dimensions of a feature map, but the weights are unique over the input and output channel dimensions. To inform the handling unit about the specifics of each function (based on the task at hand), each data structure may indicate the dimensions of the coordinates space for which changes of coordinate in said dimensions while executing the task causes the function of the associated component to execute.

To save bits and reduce complexity, each data structure may instead comprise a first number 402 (as well as a second number described further below in conjunction with FIG. 5) indicating the dimensions of the coordinate space for which changes of coordinate in said dimensions while executing the task causes the function of the associated component to execute, such as a number between 0 and N (number of dimensions in operation space, eight in the example of FIG. 4). In case the number is equal to 0 the section is invoked once per task (e.g., when the iteration over the N=>1 dimensional coordinate space starts or ends). This may for example corresponds to a function that loads a table to be used in subsequent sub-tasks no matter of coordinate or dimension. In the opposite extreme, the value could be equal to N, which means the function of the component is executed on every iteration of every dimension.

In FIG. 4, shaded elements correspond to dimensions (for each section) for which changes of the coordinate causes the function to execute (e.g. DIMS_INC_RUN). As can be seen in FIG. 4, for the data structures described as "IFM load", "weights load" and "conv", the function associated with the respective component is executed when any dimension increment. "Bias" and "scale load" are only invoked (executed) when Batch or OFM channel increment. "Scale" and "OFM write" sections are invoked when Batch, OFM C, OFM Y or OFM X increment.

In some types of tasks including operations on data, the function executed on the data may result in a fewer number of dimensions being output. For example, as can be seen in FIG. 4, a 2D convolution operation (conv) iterates over batch (N), output feature map height (OFM Y), output feature map width (OFM X), input channels (IFM C), output channels (OFM C), kernel X (KX), and kernel Y (KY). However, it reduces these seven dimensions down to four at its output (N, OFM X, OFM Y, OFM C). Similarly, a so-called "reduction operator" such as ReduceSum iterates over a tensor and sums the data across one or more dimensions, producing an output tensor with fewer dimensions than the input tensor. To inform the handling unit about the specifics of each function (based on the task at hand), each data structure may indicate the dimensions of the coordinate space for which changes of coordinate in said dimensions while executing the task causes the function of the associated component to store data in the storage, wherein the stored data being ready to be consumed by a function of a component associated with a subsequent data structure in the partially ordered set of data structures or to store final output data for the task. Put differently, when such dimension increment (i.e., the coordinate changes), a new buffer is available in the pipe to be used by a function of a component associated with a subsequent data structure in the partially ordered set of data structures, or final data for the task (i.e., for the part of the bounding box currently being processed) is being stored in an output buffer.

In some embodiments, each section comprises N dimension specifications, indicating, for each of the N dimensions of the coordinates space, implications on storage for each dimension when a coordinate in said dimensions changes while executing. To save bits and reduce complexity, each data structure may instead comprise a second number indicating the dimensions of the coordinate space for which changes of coordinate in said dimensions while executing the task causes the function of the associated component to store data in the storage, the stored data being ready to be consumed by a function of a component associated with a subsequent data structure in the partially ordered set of data structures or to store final output data for the task. The second number (reference 502 in FIG. 5) may be a number between 0 and N (number of dimensions in operation space, eight in the example of FIG. 4). Since the storage of data may only take place when the function of the associated component executes, the second number may be equal or less than the first number.

The second number being 0 indicates that the section (data structure) produces exactly one block of output ready to be consumed by a function of a component associated with a subsequent data structure/section. The second number being 1 indicates that the section produces output (ready to be consumed) only when operation space dimension 0 increments (coordinate changes). The second number being 2 indicates that the section produces output (ready to be consumed) when either operation space dimensions 0 or 1 increment, etc. In case the second number is less than the first number, this indicates a reduction operation.

In FIG. 5, shaded elements correspond to dimensions (for each data structure) for which changes of the coordinate causes the function of the associated component to store data in the storage (in contrast to FIG. 4 which relates to causing a function to execute—e.g. DIMS_INC_BUF), wherein the stored data being ready to be consumed by a function of a component associated with a subsequent data structure in the partially ordered set of data structures, or to store final output data for the task. As can be seen in FIG. 5, for the data structures described as "IFM load" and "Weights load", the function associated with the respective component stores data being ready to be consumed by a function of a component associated with a subsequent data structure in the partially ordered set of data structures when any dimension increment. "Bias" and "Scale load" only store data ready to be consumed by a subsequent function when Batch or OFM channel increment. "Scale" store data ready to be consumed by a subsequent function when Batch, OFM C, OFM Y or OFM X increment. "OFM write" store final output data for the task when Batch, OFM C, OFM Y or OFM X increment. For "Conv", IFM C, Kernel X and Kernel Y are marked as dimensions where the associated function will execute (see FIG. 4), but not as dimensions which causes the associated function to store data ready to be consumed. This means that these three dimensions are so called reduction dimensions, and seven dimensions are reduced to four at the output of Conv.

In examples, if an operation space dimension is marked (FIG. 4) as a dimension for which changes of coordinate in said dimensions causes the function of the associated component to execute but not marked (FIG. 5) as a dimension for which changes of the coordinate causes the function of the component that generates the input buffer for the associated component to store data in the storage, this indicates reuse of an input buffer by the executing section. For example, if we have sections A→B and the storage dimensions for A is less than the execute dimensions for B then there is reuse by B of the input buffer that was written by A. On the other hand, if the storage dimensions of B are less than the execute dimensions of B, then that is reduction by B onto the output buffer.

The data structure described may be generated by e.g., a compiler connected to the processor, wherein the complier is configured to generate code for the processor to execute. The execution of a neural engine task may be defined by two separate iterative processes implemented in the handling unit. In one process, the handling unit iteratively steps through the task's operation-space in block units as defined by the block size of the NED. In the other process, the handling unit iteratively steps through the dataflow graph defined by the NED and, where permitted by the dimension rules described above, transforms each block into the relevant section-space before invoking the section's execution unit with the transformed block by issuing invocation data.

In general, for most cases, these two processes are defined in the examples described herein to be architecturally independent. This means that the execution of any given block is defined definitively and completely in itself, in isolation of any other block or the state of the handling unit operation-space iteration. Execution of blocks that is not in accordance with this operation-space iteration will produce functionally correct but not provide meaningful results.

In all cases, execution of a block must not extend beyond the block's section-space boundaries. Loading and storing of data (whether mapping the section-space to coordinates of a tensor in memory, to pipes, or any other memory or pipe storage) may extend beyond the section-space as required by an implementation's granularity of access, but must not extend beyond the size of a pipe's buffer or the total size of a tensor. In this way, the following must hold for a transform to be valid for an operation-space to section-space transform to be compatible when connected by a pipe.

Assume the following scenario:
section S0 writes to a pipe P;
section S1 reads from the same pipe P;
T0( ) is the transform for section S0;
T1( ) is the transform for section S1;
B is a block in operation-space;
B0 is the absolute tensor coordinates of the block written to pipe P by S0;
This will be DST(T0(B)) where DST( ) is the fixed transform for S0's execution unit to its destination output space;
B1 is the absolute tensor coordinates of the block read from pipe P by S1;
This will be SRC(T1(B)) where SRC( ) is the fixed transform from S1's execution unit to its source input space;
Then the following must hold:
Compatible origin: Block B0 and block B1 must have the same lower bound coordinate for each dimension;
This coordinate forms the origin of the block stored in the pipe buffer;
Sufficient size: The size of block B0 must be greater or equal to the size of block B1 for each dimension;

The operation-space iteration may generate a block with one or more execution dimensions that are zero, meaning that no functional operation is required; this may occur due to padding before the start of operation-space or clipping at the end of operation-space, for example. The block must still be dispatched to the execution unit for correct tracking of dependencies and execution ordering.

To implement a reduction operation, the operation-space iteration will issue a sequence of block invocations to an execution unit (e.g. the convolution engine or vector engine) all targeting the same output block. The handling unit will signal when executing the first block in this sequence, and the execution unit must start by initializing the destination buffer (the whole buffer as limited by the block's size as described above), whereas for all subsequent blocks in the sequence the unit will read back the existing values from the buffer. In this way, the destination buffer acts as a additional input to the operation, from the perspective of individual block execution. In the case of the convolution engine, it is possible that one or more reduction dimensions are zero, meaning that no functional operation is required, but the convolution engine must still initialize the destination buffer if it is the first block in the sequence and the block's execution dimensions aren't empty.

When the handling unit invokes an execution unit to execute a block, the handling unit is configured to issue invocation data to execute the operation on a block. The block iteration is defined based on a block size specified in the NED and the issuance of the invocation data is done under the control of the DIMS_INC_RUN value as discussed above. Moreover, it is necessary for any dependencies that need to be met for the execution unit to operate on the block. These include that the required data is stored in the source pipe(s) for the operation and that sufficient storage is available in the destination pipe, as well as that the transform of the operation space to section space for that section has been performed and the output of that transform operation (i.e. the transformed coordinate data) is available to be issued to the execution unit. More specifically, it is to be ensured that there is sufficient availability in the pipe for a new block or buffer. However, this is not needed if this is not the first step in a reduction block, because in this instance the operation may involve simply read-modify-writing a previous destination block/buffer. Determining the availability of a source storage element may involve determining there is an appropriate block/buffer in the source pipe.

In an example, the invocation data comprises the output of the transform program in the form of transformed coordinates along with the relevant parts of the NED that describe that section (e.g. the configuration data from the sub-descriptor element of the NED for that section). This additional configuration data may also include the type of operation being performed (where the execution unit is able to perform more than one type of operation) and any other attributes of the operation, such as stride and dilation values in the example of a convolution operation.

The iteration process first involves reading from the NED a block size and iterating through the operation space one block at a time. For each block, a transform program is executed to transform the operation space coordinates to section space coordinates for that section. More detail on the transform programs is set out below. Once the section space coordinates have been determined, the section operation is performed in respect of that block. This process is iterated over all blocks until the operation is completed for all blocks.

Figure 6:
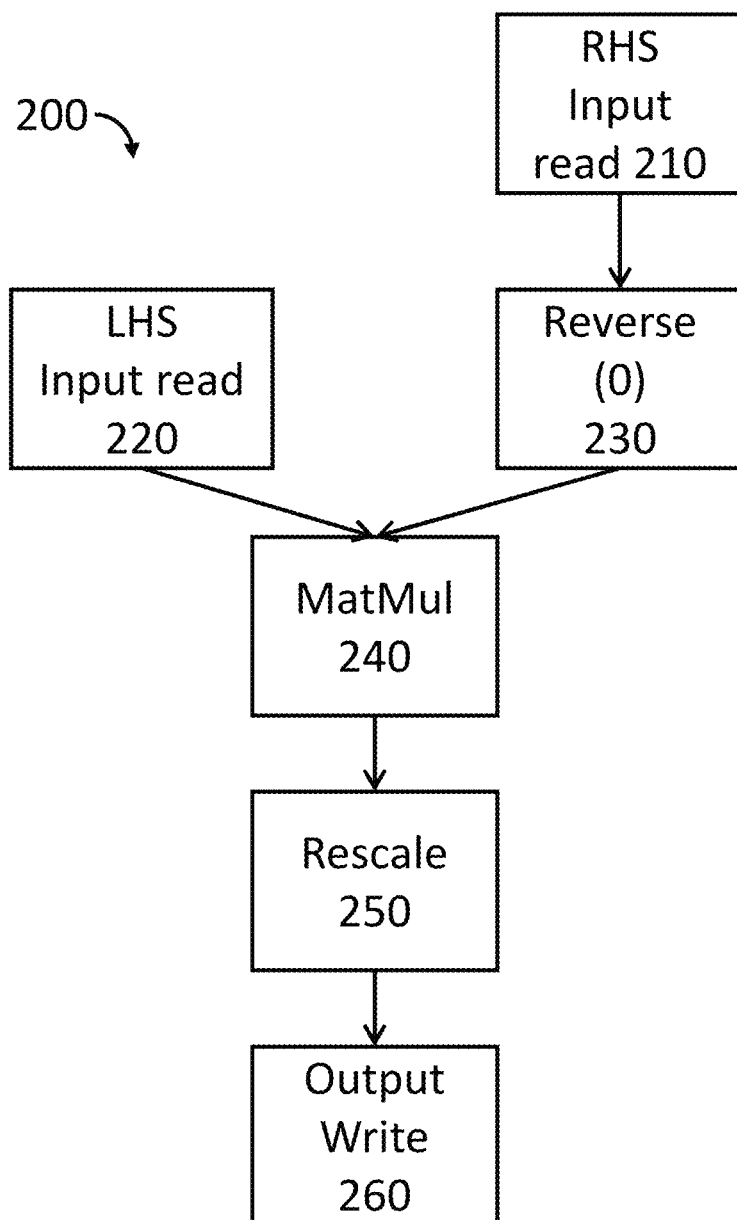
FIG. 6 illustrates an example chain of operations to be performed.

FIG. 6 illustrates an example chain 200 of operations to be performed. The chain comprises a left-hand-side (LHS) input read operation 220 and a right-hand-side (RHS) input read operation 210. The output of the RHS input read operation 210 is input into a Reverse operation 230 which in turn is output, along with the output of the LHS Input Read operation 220 into a Matrix Multiplication (MatMul) operation 240. The output of the MatMul 240 operation is input into a Rescale operation 250, the output if which is provided to an Output Write operation 260 that writes the output to memory.

Figure 7:
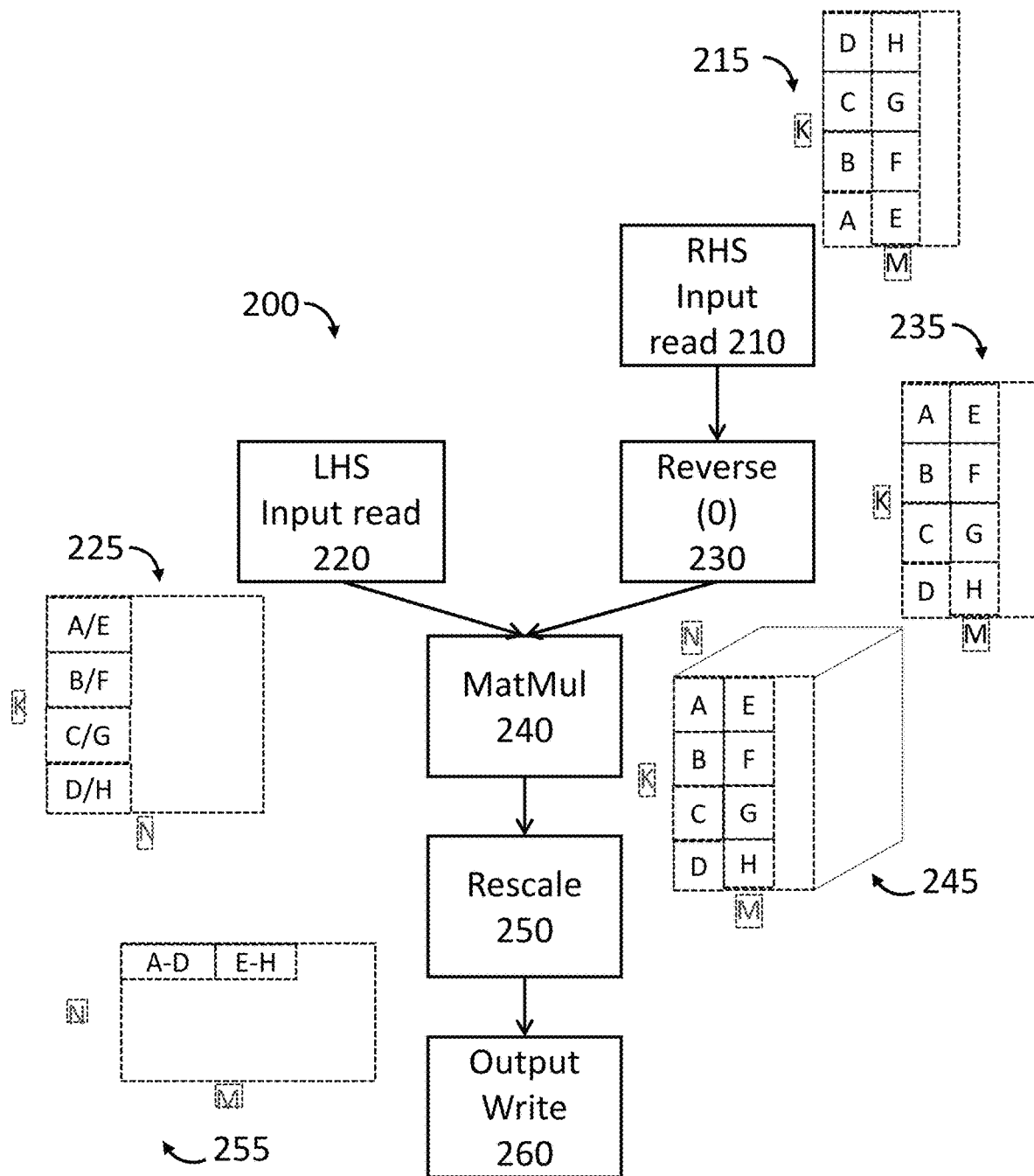
FIG. 7 illustrates an example corresponding coordinate space.

FIG. 7 illustrates the corresponding coordinate space (i.e. the section space for each of the operations). For example, the RHS Input Read section space 215 is illustrated for the RHS Input Read 210 operation. The LHS Input Read section space 225 is illustrated for the LHS Input Read operation 220. The Reverse section space 235 is illustrated for the Reverse operation 230. The MatMul section space 245 is illustrated for the MatMul operation 240. The Rescale section space 255 is illustrated for the Rescale operation 250. In this example, the section space for the Output Write operation is illustrated using the section space 255 since this is unchanged from the section space for the Rescale operation.

Each section space comprises a plurality of dimensions—namely two dimensions (e.g. K,N; K,M). The section space is separated into blocks having a pre-defined block size—with each of blocks A to H representing a different block to be operated on in line with the examples set out herein.

As can be seen, the Reverse section space 230 has a dimensionality which is effectively reversed with respect to the RHS Input Read section space 215. Section space 225 for the LHS Input Read contains blocks A/E, B/F, C/G, D/H which are repeated. The section space 255 for the Rescale and Output Write operation contains two blocks, A-D and E-H. This is because the MatMul operation is a reduction operation. In the MatMul example in FIG. 7, a MatMul of two matrices 225 with 235 is performed. Matrix 225 has dimensions K×N and matrix 235 has dimensions K×M. The output 255 has dimensions N×M, so the K dimension has been reduced. MatMul could be described with the 3D operation space of N, M, K.

As will be appreciated the operations set out in FIG. 7 are sections which can be respectively executed by different execution units. The handling unit may be configured to control execution of the various blocks such that a particular block is able to flow through the chain of operations defined by the graph or sub-graph. The "A/E" notation in these figures illustrates that a block is being repeated. For example, blocks A and E have the same coordinates in some dimensions (K, N) but there is another dimension (M) that has changed but is not mapped into 220's coordinate space. The "A-D" notation indicates that blocks have been reduced and merged into a single block. E.g. blocks A, B, C, D have been reduced down into a single block. These blocks vary in dimension K but dimension K has been reduced. An example scheduling of the blocks set out in FIG. 7 is illustrated in FIG. 8.

FIG. 8 illustrates an example iteration through blocks for the chain of operations in FIGS. 6 and 7 for a series of invocation time instances 0 to 11. At time invocation time instance 0, block A is processed concurrently by execution units executing LHS and RHS read operations. These operations have no dependencies and in this example can be handled in a single invocation time instance and so are issued concurrently. Since LHS and RHS read operations are not dependent on one another, for all subsequent invocation time instances a next block (e.g. block B at time instance 1) is invoked for execution until all blocks A to H have been executed at time instance 7. This operation may still stall if there is not space in the destination pipe for that section.

Since the Reverse operation is a subsequent operation dependent on the output of the RHS read operation, the processing of block B by the Reverse operation can only be invoked at time instance 1. The processing of blocks by the Reverse operation is therefore delayed by one invocation time instance with respect to the RHS read operation. Similarly, the MatMul operation is dependent upon the output of the Reverse operation and so the MatMul processing of blocks is further delayed by one invocation time with respect to the Reverse operation.

Rescale operation operates on block of data which is derived from a set of four reduced blocks of data, e.g. A to D or E to H in a single invocation. As such, the Rescale operation is not invoked until all input dependencies have been met, i.e. that the MatMul operation has been performed on each of blocks A to D at time instance 6. Similarly, blocks E to H are not invoked for execution until time instance 10. The Output Write operation is dependent upon the completion of the Rescale operation and so is not invoked until time instance 7 for a block derived from the processing of blocks A to D, and similarly at time instance 11 for a block derived from the processing of blocks E to H.

In this way, the processing iterates through all the blocks until the complete operation space has been executed.

The process for generating an operation space from which each of these respective section spaces can be expressed will be described in more detail later but in this example the operation space for this chain of operation is taken to be the section space 245 for the MatMul operation 240 since all other section spaces can be expressed from the MatMul section space 245.

Programmability of Operation Space to Section Space Transforms

As discussed above, the operation space for a task (sub-graph) may contain a pre-determined number of dimensions (e.g. eight) but the local section space for the operation to be performed for a specific section in that graph can contain fewer than 8 dimensions. Also, as described above, the handling unit may iterate through the operation space in units known as blocks, transforming each block from the common operation-space to a section-specific space described by the various fields in the NED.

In an example implementation, the NED may further comprise for each element in the NED (e.g. each section/pipe) a program comprising transform program data that describes a transform from operation space to section space (local space) for the corresponding section. In one such implementation, each element in the NED may comprise an offset value that points to the specific program within the NED for executing the transform. This offset value may be regarded as a pointer into 'program space', being the space in which all the programs which define the various enabled transforms are located. Alternatively, the offset value may be a pointer into a virtual address space in main memory. For example, this program space can be defined in the NED as a field tsu_space_size which for example is sized as 256 bytes. The offset may point to a memory location at which the start of its section-space transform is placed (e.g. the first instruction in a sequence of instructions which collectively define a program for performing the transform).

Each transform program may end with an explicit END instruction, and may be followed without any spacing or alignment by a next program defining a sequence of instructions for executing a different transform that is associated with a different element. Alternatively a starting pointer may be used in conjunction with a total number of instructions to execute.

In an example implementation, the sequence of instructions used for each transform may be selected from a set of pre-determined instructions which effectively form an instruction set. This instruction may be regarded as a transform instruction set which may be a specific set of instructions selected optimally to perform transforms from operation space to section space. Alternatively, the transforms may be general purpose instruction set as seen in a central processing unit (CPU).

In an example implementation, a transform instruction may operate on a set of state values for the transform. The state values comprise boundary registers (in one example eight boundary registers b [0] to b [7]) each comprising a low and a high component. Each block in the operation space is defined by the values described in the low and high components of the eight boundary registers. These values indicate the upper and lower bounds (inclusive) for the coordinates in the block for that axis of the "bounding box" operation space.

In this example, no other state is available to the instructions which operate to transform the operation space to a local section space for a specific operation to be performed. All operations performed by the instructions therefore operate on the boundary registers, including intermediate calculations.

Some sequences of instructions will transform one dimension at a time, starting with dimension 0 (e.g. b[0]) and work iteratively inwards through the dimensions. In other more complex sequence of instructions, more complex transforms may need to jump around by modifying the destination register identifier explicitly e.g. by using a SETD instruction in the set of instructions.

An example of a transform program to be used to transform the output dimensions of a convolution operation are set out below using a register swap instruction with destination modifier D and dimension d:

```
program, 4 instructions, 4 bytes
(d=0) Register swap b[d], b[1]   //swap OC and N
(d=1) SWP.D b[d], b[2]           //swap OC and OY
(d=2) SWP.D b[d], b[3]           //swap OC and OX
END
```

This sequence of instructions represents the following affine transformation for the output dimensions of the convolution operation:

| OFM | OC | N | OY | OX | IC | KY | KX | Offset |
|-----|----|----|----|----|----|----|----|--------|
| N   |    | 1 |    |    |    |    |    |        |
| OY  |    |   | 1  |    |    |    |    |        |
| OX  |    |   |    | 1  |    |    |    |        |
| OC  | 1  |   |    |    |    |    |    |        |
|     |    |   |    |    |    |    |    | 1      |

The result of executing the transform program for a specific block defines a block in section space, ready to be used for the invocation of the specific hardware execution unit that is to execute the section. In the case of many types of operation to be performed by a hardware execution unit to execute a section, the execution unit does not use a full 8-dimension section space. The handling unit therefore defines an invocation structure for each unit that defines the relevant requirements for that operation.

Memory Division and Coordinate Mapping

The arrangement of hardware components such as memory, processing circuitry and registers, among others, can directly and indirectly affect the efficiency and cost of manufacturing such hardware components. For example, the performance of neural network functions and operations, such as those described above requires a large amount of processing resources and as such efficient data transfer between the hardware components is required. This may, in some examples, require a large number of connections between the components in order to route data efficiently, and correctly between said components.

In some examples, a processing unit, such as a neural engine, such as neural engine 700 described above may comprise a number of components, such as a vector engine, convolution engine and buffer as will be appreciated in light of the above description. However, due to relatively large data transfers between the buffer or other shared memory, and the components of the processing unit, it may be desirable to separate processing tasks and operations in order to minimize and/or efficiently arrange connections between the components of the processing unit. That is it is desirable to efficiently map between coordinates of a multi-dimensional tensor (e.g., a four dimension tensor) to the corresponding data in a shared buffer such as storage 738 (e.g., a two dimension storage address). This enables efficiencies to be gained since within a given processing slice of a processing unit there may be a high-bandwidth connection between a portion of the shared buffer and the processing slice components. This enables such high bandwidth operations to be undertaken provided the data is stored in the associated portion of the shared buffer. To do so requires an accurate mapping of the coordinates of a multi-dimensional tensor such that the correct data is stored in the correct processing slice of the processing unit.

Figure 9:
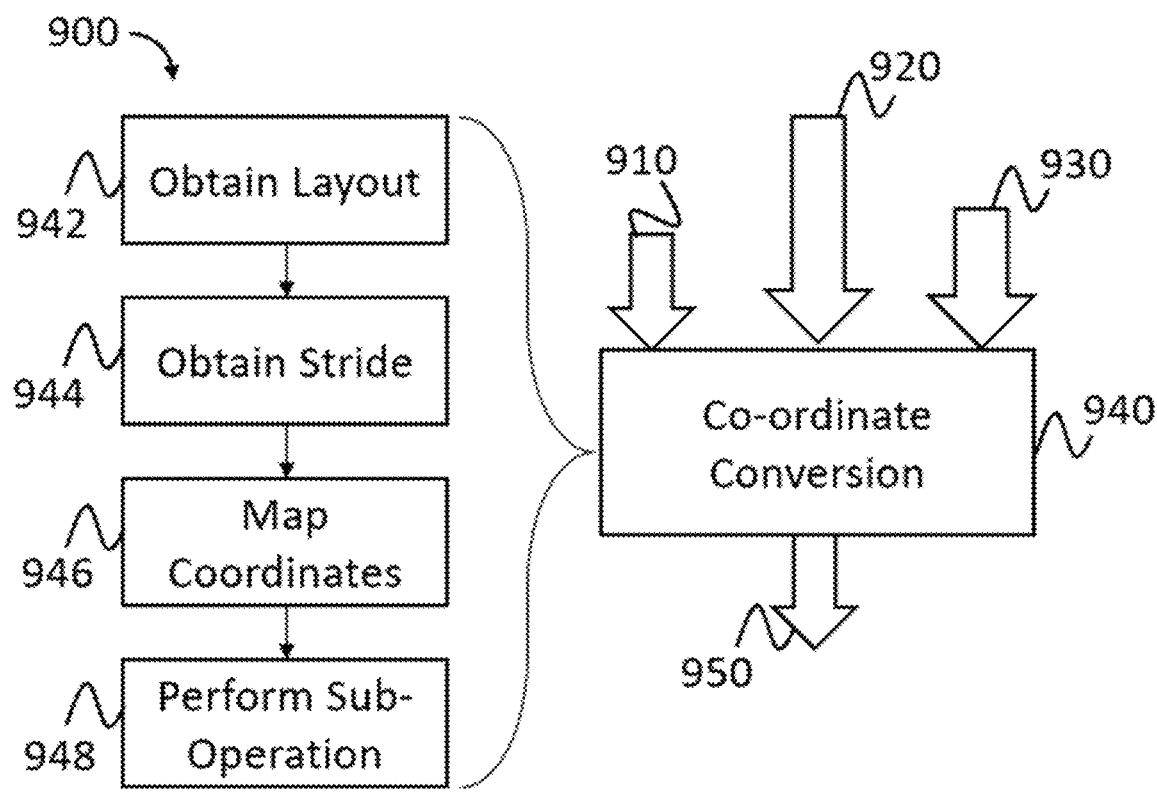
FIG. 9 illustrates a method of mapping coordinates according to an example.

FIG. 9 shows, schematically, a method 900 for mapping coordinates of a multi-dimensional tensor of data to be processed to a shared storage of a processing unit. The mapping of coordinates may be in response to a task or command stream comprising a plurality of operations, which themselves may comprise sub-operations. The task or command stream may be the command stream described above with reference to neural engine 700 and the Neural Engine Descriptor (NED). The processing unit may be processing unit 1000, which will be described in further detail below with reference to FIG. 10. As will be described in further detail below with reference to FIG. 10, the processing unit 1000 may comprise a plurality of processing slices, wherein each processing slice is configured to perform at least one sub-operation of an operation, and each slice comprises at least a portion of the shared storage.

As part of the method 900, coordinates of the multi-dimensional tensor of data 910 are received, alongside a layout of the shared storage 920, and a stride 930, as will be described in further detail below. The coordinates of the multi-dimensional tensor of data 910 are then mapped using coordinate conversion scheme 940 according to an example. The coordinate conversion scheme 940, comprises obtaining 942 the layout of the shared storage 910. The layout of the shared storage 910 may be calculated and/or obtained from memory. The layout of the shared storage 910 indicates a layout of configurable data regions defined in terms of banks comprising two-dimensional regions within the shared storage as will be described below in more detail with reference to FIGS. 11 and 12.

Similarly, the stride 930 is also obtained 944. The stride is a distance in the address space between data when incrementing in a particular dimension. The shared storage 910 is configured to store data using a two-dimensional address array as will be explained in connection with FIG. 11. Accordingly, when storing a tensor with three or more dimensions, at least one dimension is spread across the two-dimensional address space such that there is a stride to find data that is adjacent in the at least one dimension.

The stride may be precalculated by, for example, the handling unit (TSU) 720, or may be retrieved from a storage, and may be for a given dimension of the multi-dimensional tensor. For example, where the multi-dimensional tensor is a four-dimensional tensor, the stride may be determined for the third dimension of the multi-dimensional tensor, and fixed in accordance with the layout. The stride may be fixed or may be variable and dependent upon the distance between data items stored in the shared buffer, representing an increment in a particular dimension (e.g., the third dimension) in the tensor space. The stride may also be dependent upon the size of the data in the multi-dimensional tensor. As mentioned this may be calculated in instantiation, such as at compile time.

Based on at least the coordinates of the multi-dimensional tensor 910, the layout of configurable data regions, the stride 930 of the at least one dimension, (and in some cases a configuration of the operation in the task data of the multi-dimensional tensor), the coordinates of the multi-dimensional tensor, are mapped 946 to the configurable data regions of the shared storage. The configuration of the operation in the task data may refer to one or more properties associated with the task data, and or the layout of sections and pipes (see above), or the command stream provided by the NED. The skilled person would understand that there are a number of ways in which the mapping of the multi-dimensional tensor coordinates 910 to the portions of the shared storage in the plurality of processing slices may be undertaken, in particular for performing a sub-operation of an operation, especially when based on the offset, bank numbers, and the configurable storage. In one particular example, the offset is indicative of the start address of each portion of the shared storage, and the bank number is indicative of a given block of the shared storage in the portion. The configuration of the shared storage will be described in further detail below with respect to FIGS. 11 and 12.

The mapping of the coordinates of the multi-dimensional tensor to locations in the shared storage is preferentially arranged to locate data (i.e., portions of the multi-dimensional tensor) that is operated on by a particular processing slice within regions of the shared storage that are (more easily) accessible by that particular processing slice. As explained above, the processing slices may be provided with a high-bandwidth connection to particular regions of the shared storage, or in some examples, may only be able to access certain regions of the shared storage. Thus, to take advantage of these high-bandwidth connections or to ensure that the processing slices are able to access the data that they need, the mapping may preferentially map the portions of the multi-dimensional tensor to regions of the shared storage based on a determination of the processing slice that will operate on that portion of the multi-dimensional tensor. Furthermore, by taking into account the layout of the configurable data regions with the shared storage in the mapping, the flexibility to allocate the shared storage as desired can be maintained.

In some examples, the operations performed by each processing slice are decided according a predetermined scheme. Such a scheme may be based on distributing the co-ordinates in a particular dimension (e.g., dimension 3 of the tensor) across the processing slices. According to such a scheme, a first co-ordinate range within the particular dimension may land in a first processing slice, a second co-ordinate range in the particular dimension may land in a second processing slice and so on. The mapping is then used to ensure that the appropriate portions of the multi-dimensional tensor get stored in the preferred portions of the shared storage for the processing slice. Continuing the example above, the mapping may therefore take into account the co-ordinate value of a portion in the particular dimension to ensure that the 'first co-ordinate range' is assigned to a region of the shared storage with (preferred) access to the first processing slice. It will be recognized that other schemes for associating portions of the tensor to processing slices may also be used, with corresponding approaches taken for carrying out the mapping.

An example mapping is set out below, where the location in the shared storage (expressed as the bank_offset and bank_number) is calculated based on the co-ordinates of the tensor (dim0, dim1, dim2, dim3), the layout of a configurable data region in question (start_offset, start_bank_col, num_banks_col) and the strides (dim0_stride, dim1_stride, dim2_stride, dim3_stride). In this example, a predetermined scheme for associating sub-operations with processing slices is employed based on the co-ordinate of region of the tensor being operate in dimension 3.

The following table shows constants that are set for the design of the processing unit 1000.

| Parameter name | Description |
| --- | --- |
| SB_COLUMNS | Number of shared buffer columns |
| SB_ROWS | Number of shared buffer rows |
| SB_BANK_DEPTH | Number of words in a shared buffer bank. |

The number of columns shown in the example of FIG. 11 is eight. The number of rows illustrated in FIG. 11 is ten. A word represents the granularity within the banks. There are 512 words in a bank. In other implementations these parameters may take different values. The following parameters are set in the NED and relate to the pipe:

| Parameter name | Description |
| --- | --- |
| num_buffers | Number of physical buffers in the configurable data region. |
| start_bank_col | Starting bank in the x direction. |
| num_banks_col | Number of banks in the x direction. |
| pipe_start_offset | A data region's starting offset in a column. |
| buffer_num_offsets | Total number of offsets in one buffer |

The following parameters are determined based on the tensor received and, in some implementations, may be configured parameters of the processing unit 1000.

| Parameter name | Description |
| --- | --- |
| d3_per_tensor | Number of dim3 elements in a tensor |
| d2_per_tensor | Number of dim2 elements in a tensor |
| d1_per_tensor | Number of dim1 elements in a tensor |

The following table shows the determination of addresses for data having position dim0, dim1, dim2, dim3 in the shared storage:

| | |
| --- | --- |
| Offset | Start_offset + dim0*dim0_stride + (dim1/dim1_per_tensor)*dim1_stride + (dim2/dim2_per_tensor)*dim2_stride + (dim3/(dim3_per_tensor |

| | |
|---|---|
| Bank_row | *num_banks_col)*dim3_stride offset/SB_BANK_DEPTH |
| Bank_column | Start_bank_col + dim3/d3_per_tensor %num_banks_col |
| Bank_offset | Offset%SB_BANK_DEPTH |
| Bank_number | Bank_row*SB_COLUMNS + bank_column |

The Offset is an offset from the top of a column. The offset is the same for all banks of a pipe in a row. The Offset includes the following terms:
Start_offset, which is a parameter of the configurable data region in which the data is being stored
dim0*dim0_stride, which is the product of the location of the data by the stride in the 0 dimension
(dim1/dim1_per_tensor)*dim1_stride, which is a fraction of the dim1 coordinate and the size of the tensor in dimension 1, multiplied by the dimension 1 stride (dim1_stride). It is recalled that dim1_stride identifies the spacing of the dimension 1 data in the shared storage and may be provided in the NED. This localizes the data value being referenced to the correct position with respect to dimension 1.
(dim2/dim2_per_tensor)*dim2_stride, which is a fraction of the dim2 coordinate and the size of the tensor in dimension 2, multiplied by the dimension 2 stride (dim2_stride). It is recalled that dim2_stride identifies the spacing of the dimension 2 data in the shared storage and may be provided in the NED. This localizes the data value being referenced to the correct storage location with respect to dimension 2.
(dim3/(dim3_per_tensor*num_banks_col)*dim3_stride, which is which is a fraction of the dim3 coordinate and a product of the size of the tensor in dimension 3 multiplied by the number of banks in the x direction. This term is multiplied by the dimension 3 stride (dim3_stride). This term is modified by the number of banks to be used (num_banks_col) which may cause the dimension 3 data to be spread out and is specified in the NED. It is recalled that dim3_stride identifies the spacing of the dimension 3 data in the shared storage and may be provided in the NED. This localizes the data value being referenced to the correct storage location with respect to dimension 3.

Bank_row is determined as the Offset divided by the number of words that may be stored in bank (SB_BANK_DEPTH).

Bank_column is determined as the starting bank column defined in the NED (Start_bank_col) plus a term that defines the position in dimension three. The term is formed by taking the position in dimension 3 (dim3) divided by the size of the tensor in dimension 3 (dim3_per_tensor). The result is divided by the number of banks per column (num_banks_col) and rounded up.

The Bank_offset is the determined Offset divided by the number of words in a bank (BANK_DEPTH) and rounded up.

The Bank_number is determined as the Bank_row multiplied by the number of columns in the shared storage (SB_COLUMNS) plus the current bank column (bank_column).

Once the coordinates of the multi-dimensional tensor have been mapped to the portion(s) of the shared storage, at step 948 a sub-operation of the operation may be performed by an execution unit based on the mapped coordinates. It will be appreciated that the sub-operation may be any appropriate operation, such as those described above, including but not limited to storing or distribution the data of the multi-dimensional tensor to the configurable data regions in accordance with the mapping generated/calculated in step 946.

The operation may be one such as that described above with reference to the NED, which is configurable into a plurality of sections and pipes, where sections represent the individual sub-operations, and the pipe represents portions of storage required for performing said operations. As such, the configurable data regions may be akin to the pipes in the examples described above.

The mapping of the coordinates by the method 900 described above may be in response to scheduling of an operation by the handling unit 720, such that the portion of shared storage and the processing circuitry associated with a given processing slice are configured for use by the operation. Data of the multi-dimensional tensor is stored in one or more configurable data regions of the shared storage, such that the shared storage may be distributed and accessible by the plurality of the processing slices.

In addition to being able to access a portion of the shared storage, each processing slice may also comprise processing circuitry which is configured to access the data in the shared storage of that given processing slice, as well as other processing circuitry that may be configured to access data across the entirety of the shared storage, or portions of the shared storage which are not associated with the processing slice. As will be described below, the shared storage may not be physically associated with the processing slice, that is there may not be individual memories within each processing slice, but instead may be logically associated with the processing slice. That is the portion of the shared storage may form part of a larger collection of memory such that any division among the processing slices is logical.

Figure 10:
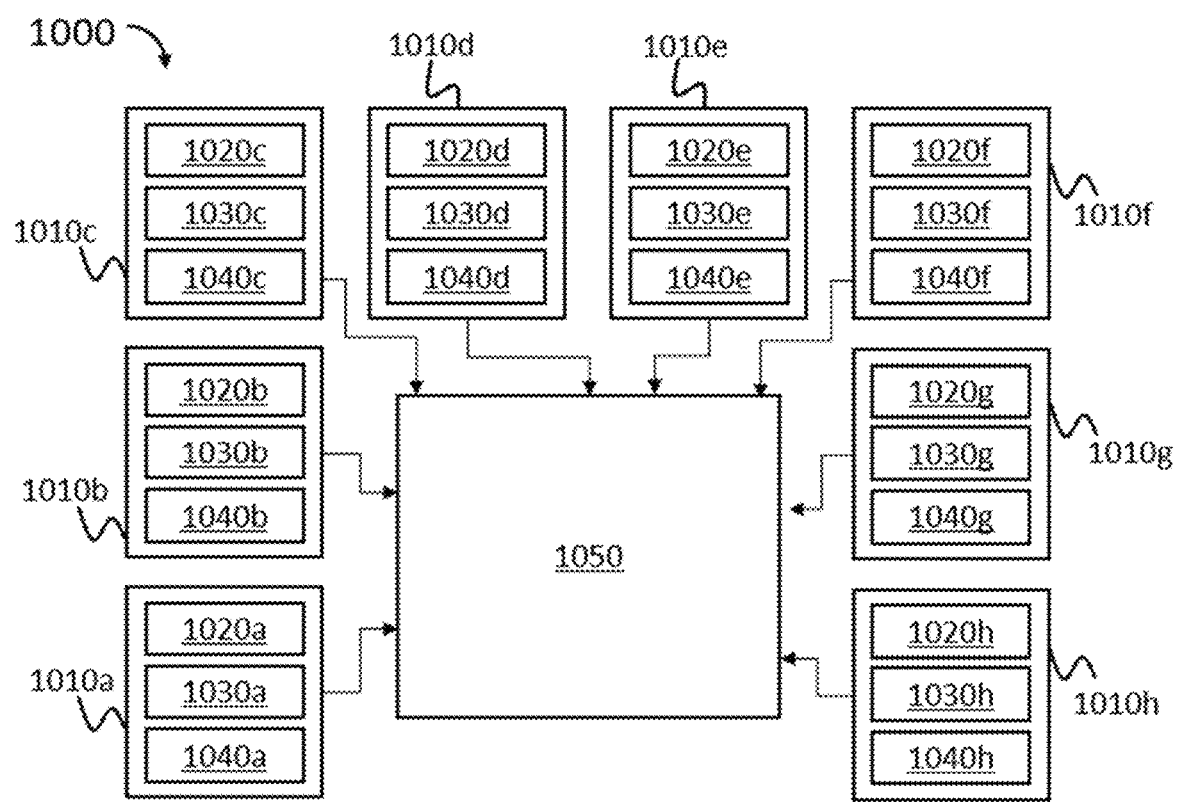
FIG. 10 illustrates schematically an example processing unit according to an example.

FIG. 10 shows, schematically, a processing unit 1000 configured for undertaking the method 900 described above. The processing unit 1000 may be or form part of the neural engine 700 described above with reference to FIG. 2. The processing unit 1000 shows a plurality of processing slices 1010a-h, and a transform unit 1050. The transform unit 1050 may belong to a common processing slice (not shown) comprising other hardware components. The transform unit 1050 is communicably coupled to each of the plurality of processing slices 1010a-h. Whilst the processing unit 1000 of FIG. 10 shows eight separate processing slices 1010a-h, it will be appreciated that there may be more or less than eight in any given embodiment. The processing unit 1000 is used for handling a task, such as the tasks described above, and comprising a plurality of sections and pipes, however, it will be understood that the processing unit 1000 may be used for the processing of any other suitable task. The processing unit is specifically configured such that coordinates of a multi-dimensional tensor can be mapped to the shared storage associated with each of the plurality of processing slices 1010a-h.

Each processing slice 1010a-h may have access to at least a portion of the shared storage 1020a-h as described above. In particular, each processing slice may have prioritized access to at least a respective preferred portion of the shared storage than another respective less preferred portion of the shared storage. The shared storage may be SRAM, and each portion of the shared storage 1020a-h may be configured to store data associated with the multi-dimensional tensor such that processing circuitry 1030a-h, 1040a-h of the processing slice 1010a-h can perform an operation, or part of an operation associated with the task on the data stored in the portion of the shared buffer 1020a-h.

The processing slices 1010a-h may comprise first processing circuitry 1030a-h, which may be configured to access only the data stored within the portion of the shared buffer 1020a-h. As such, the first processing circuitry 1030a-h may have a high bandwidth connection to the portion of the shared storage 1020a-h in its given processing slice 1010a-c. In some examples, the processing slices 1010a-h may also comprise second processing circuitry 1040a-h which is configured to access data stored within the entirety of the shared storage or portions of the shared storage 1020a-c which are outside of the given processing slice 1010a-h. Furthermore, the first and second processing circuitry 1030a-h, 1040a-h may be configured to access storage which is located (either logically or physically) in the transform unit 1050 or in another component outside of the processing unit 1000. In some examples, the first processing circuitry 1030a-h may be a vector engine, such as the vector engine 732 described above with reference to neural engine 700 in FIG. 2, and the second processing circuitry 1040a-h may be a convolution engine, such as the convolution engine described above with reference to neural engine 700 in FIG. 2. In some examples, the processing slices 1010a-h may also comprise other memory, such as accumulator storage (not shown).

The transform unit 1050 may be configured to perform operations, and/or sub-operations on data which requires access to data stored in more than one of the processing slices 1010a-h. The transform unit 1050 may, in some examples, may be the transform unit 734 described above with reference to neural engine 700 of FIG. 2. In other examples, the transform unit 1050, may form part of a larger common processing slice which may comprise a synchronization unit for determining the stride based on the given dimension of the multi-dimensional tensor. The synchronization unit may be the handling unit 710 described above in relation to neural engine 700 of FIG. 2.

As described above with reference to FIG. 9, the processing unit is configured to obtain a layout of the shared storage, such that the layout indicates the layout of configurable data regions of the shared storage across the plurality of slices 1010a-h. That is the layout indicates which processing slice(s) a configurable data region is located within/between the portions of shared storage 1020a-h, such that operations which require the use of the data stored in said configurable data region may be allocated to the corresponding processing slice 1010a-h. The stride of a given dimension of the multi-dimensional tensor is also obtained based on the layout of the shared storage, such as that the multi-dimensional tensor is split down one the given dimension. A mapping is then undertaken based on the layout of the shared storage and the stride of the given dimension. Sub-operations of the operation of the task may then be performed by the processing circuitry 1030a-h, 1040a-h of the processing slices 1010a-h in parallel since the processing slice 1010a-h has access to the data stored within the portion of shared storage 1020a-h.

FIG. 11 shows schematically the shared storage 1400 accessible by a plurality of processing slices, such as processing slices 1010a-h of FIG. 10. The shared storage 1400 comprises 80 logical banks, laid out in 8 columns and 10 rows. Each column is representative of a given processing slice 1010a-h, such that a first processing slice 1010a can see the logical banks associated with the column titled 'Slice 0', and a second processing slice 1010b can see the logical banks associated with the column titled 'Slice 1', and so on.

It will be appreciated that whilst there are eight processing slices 1010a-h shown in the processing unit 1000 of FIG. 10 and eight columns in the shared storage, these numbers are not intended to be limiting and any number of processing slices 1010a-h and columns in the shared storage 1400 may be used. Further, the number of processing slices 1010a-h and the number of columns in the shared storage 1400 do not need to be equal.

Figure 12:
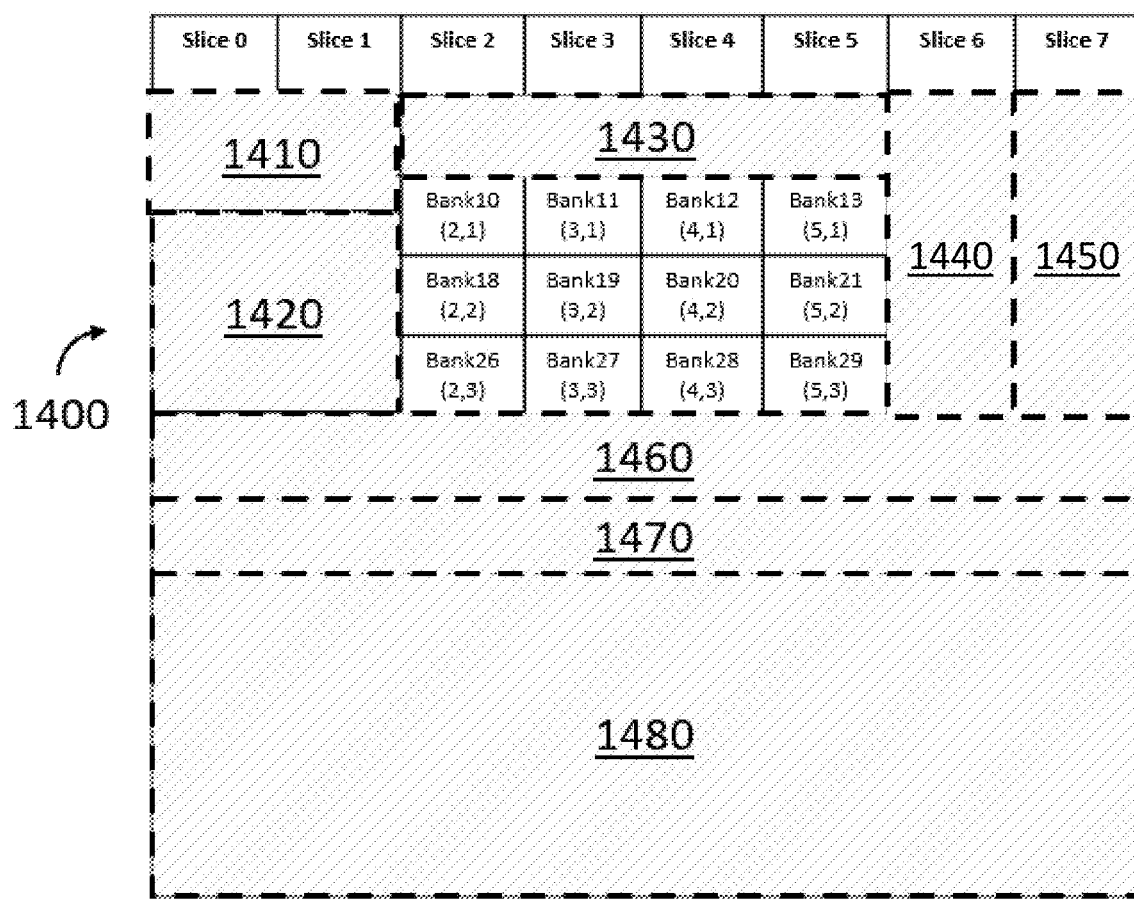
FIG. 12 illustrates schematically an example allocation of configurable memory regions in the shared memory example of FIG. 11.

FIG. 12 shows, schematically, how the configurable data regions 1410-1480 may be laid out among the shared storage 1400. At compile time, the compiler determines how best to lay out the configurable data regions 1410-1480. This may be based on the pipes defined by a Neural Engine Descriptor which may define the task as described above. Therefore, the compiler can, for a given task, operation or sub-operation, define which configurable data region will occupy which of the banks in the shared storage 1400. As described above, certain processing circuitry 1030a-h, 1040a-h, may only have access to the data stored within the banks of the shared storage logically/physically associated with the corresponding processing slice 1010a-h. In some examples, the processing circuitry 1030a-h, 1040 a-h may have prioritized access to the banks of the shared storage logically/physically associated with the corresponding processing slice 1010a-h. Prioritized access may mean quicker/more efficient access, or could be a case of being able to access or not being able to access the banks of the shared storage. In some examples, the prioritized access means that there is a high bandwidth, low power access to the data. As such, the compiler arranges the configurable data regions, such that the necessary data is accessible by the operation/sub-operations being performed by the given processing slice 1010a-h.

As part of the compilation process, the Neural Engine Descriptor (or any other suitable program) which defines the task to be handled by the processing unit 1000, may define the configurable data regions 1410-1480, referred to previously as pipes in the sections above. The configurable data regions may be defined based on:
  a start column—representing the starting location of the configurable data region 1410-1480—for example, configurable data region 1430 starts at slice 2;
  a column size—representing how many slices the configurable data region 1410-1480 covers—for example, configurable data region 1460 covers all eight slices, whereas configurable data region 1440 only covers slice 6;
  a start offset—representing a row that the configurable data region starts in—for example, configurable data region 1430 starts in row 0, and configurable data region 1470 starts in row 5;
  and number of offset/row size—representing how many rows the configurable data region covers—for example, configurable data region 1460 covers 1 row, whereas configurable data region 1480 covers 4 rows.

It will be appreciated that the configurable data regions 1410-1480 need not cover all banks within the shared storage 1400, and that some banks may not be allocated to a given configurable data region. The unallocated banks may still be accessible from any processing slice, such as by the second processing circuitry.

The above parameters which are used to define the configurable data regions 1410-1480 are used to define the layout of the shared storage 1400 described above with reference to method 900 of FIG. 9, and as such are used to map the coordinates of the multi-dimensional tensor of data such that the relevant data is allocated to the relevant configurable data region 1410-1480 in the storage for use by a processing slice 1010a-h when performing a given suboperation of an operation required by the task. This ensures that the relevant data is available in the portion of shared storage 1020a-h for use by the processing circuitry 1030a-h, 1040a-h of the processing slice 1010a-h. This increases efficiency, whilst minimizing hardware requirements since there is no requirement for a high bandwidth connection between each processing slice and each bank of the shared storage 1400.

At least some aspects of the examples described herein comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

Concepts described herein may be embodied in a system comprising at least one packaged chip. The [apparatus/circuitry—amend appropriate for specific case] described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 13:
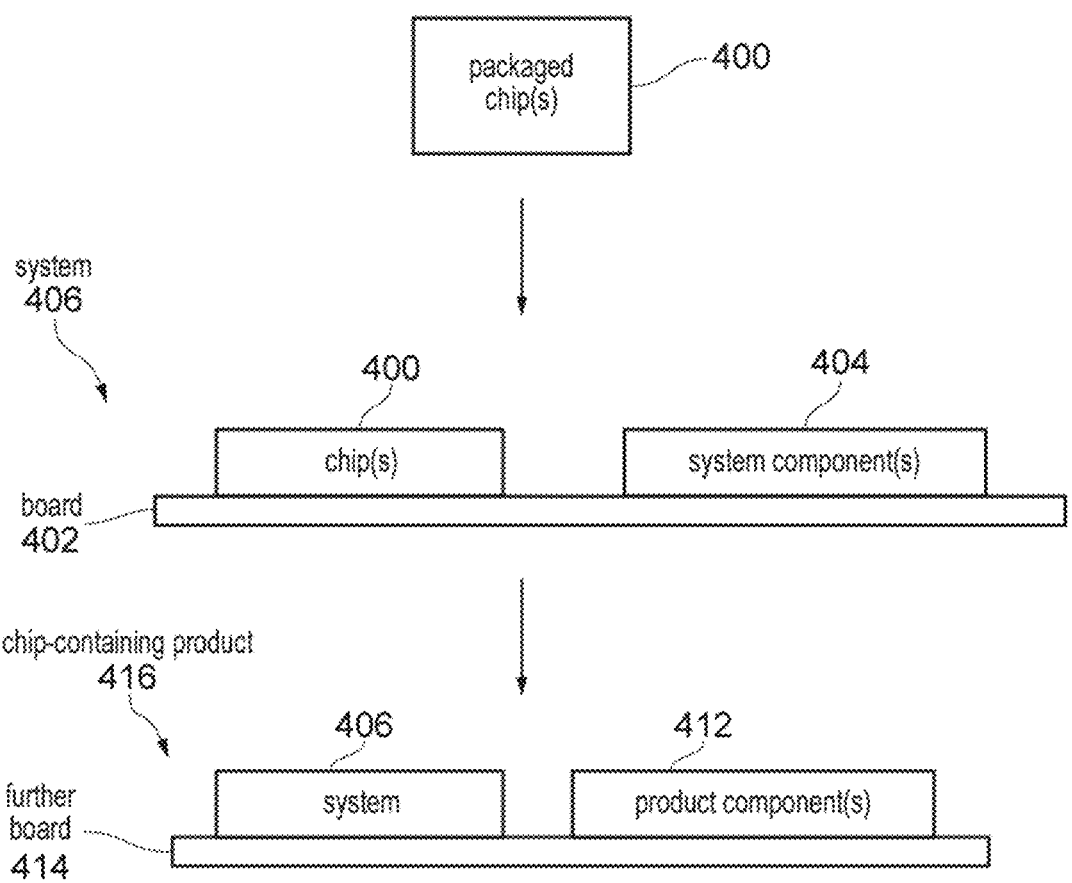
FIG. 13 illustrates schematically, a system comprising one or more packaged chips according to an example.

As shown in FIG. 13, one or more packaged chips 400, with the processing unit described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the [apparatus/circuitry] described above and/or connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative examples of the disclosure. Further examples of the disclosure are envisaged. It is to be understood that any feature described in relation to any one example may be used alone, or in combination with other features described, and may also be used in combination with one or more features of any other of the example, or any combination of any other of the examples. Furthermore, equivalents and modifications not described above may also be employed without departing from the scope of the disclosure, which is defined in the accompanying claims.

What is claimed is:

1. A method of mapping coordinates of a multi-dimensional tensor of data to be processed to a shared storage of a processing unit in response to task data defining an operation, the processing unit comprising a plurality of processing slices, each processing slice for performing a respective sub-operation of the operation, and, having prioritized access to at least a respective preferred portion of the shared storage than a respective less preferred portion of the shared storage, the method comprising the steps of:

obtaining a layout of the shared storage, the layout indicating the layout of configurable data regions within the shared storage wherein the configurable data regions are defined in terms of banks comprising regions of the shared storage;

obtaining a stride for at least one dimension of the multi-dimensional tensor;

mapping the co-ordinates of the multi-dimensional tensor to locations in the shared storage, wherein the mapping comprises calculating a bank number and an offset, wherein the bank number and offset are calculated based on coordinates of the multi-dimensional tensor, the layout of the configurable data regions and the stride of the at least one dimension; and performing, by each processing slice, the respective sub-operation on the data of the multi-dimensional tensor in accordance with the mapping.

2. The method of mapping coordinates of the multi-dimensional tensor of data to the shared storage of the processing unit according to claim 1, where the respective sub-operations operate on respective portions of the multi-dimensional tensor, and wherein, for a given processing slice, the mapping is such that the portion of the multi-dimensional tensor operated on by the given processing slice is mapped to the preferred portion of the shared storage for the processing slice.

3. The method of mapping coordinates of the multi-dimensional tensor of data to the shared storage of the processing unit according to claim 2, wherein the processing unit is arranged to employ a predetermined scheme to determine which processing slice is to perform the respective sub-operations of the operation, the predetermined scheme based on the co-ordinate of the multi-dimensional tensor being operated on by the respective sub-operations, and wherein mapping the co-ordinates of the multi-dimensional tensor to locations in the shared storage is based on the predetermined scheme.

4. The method of mapping coordinates of the multi-dimensional tensor of data to the shared storage according to claim 2, wherein the processing unit is arranged to determine the processing slice to perform a given sub-operation based on a co-ordinate in a particular dimension of a portion of the multi-dimensional tensor to be operated on, and mapping the co-ordinates of the multi-dimensional tensor to locations in the shared storage is based on the co-ordinate of the multi-dimensional tensor in the particular dimension to ensure that the portion of the multi-dimensional tensor operated on by the given sub-operation is mapped to the preferred portion of the shared storage for the processing slice.

5. The method of mapping coordinates of the multi-dimensional tensor of data to the shared storage of the processing unit according to claim 1, wherein the bank number and offset represent at least a part of one or more configurable data regions of the shared storage for use by the operation, and wherein the task data defining the operation is for data of the multi-dimensional tensor, stored in the one or more configurable data regions of the shared storage.

6. The method of mapping coordinates of the multi-dimensional tensor of data to the shared storage of the processing unit according to claim 5, wherein the mapping of the coordinates is such that data required by the sub-operation being executed by at least one of the first processing circuitry or the second processing circuitry of a given processing slice is stored in the shared storage of the given processing slice.

7. The method of mapping coordinates of the multi-dimensional tensor of data to the shared storage of the processing unit according to claim 1, wherein each processing slice comprises first processing circuitry for accessing data across the shared storage, and second processing circuitry for accessing data of the multi-dimensional tensor in the portion of the shared storage.

8. The method of mapping coordinates of the multi-dimensional tensor of data to the shared storage of the processing unit according to claim 1, wherein the shared storage is distributed among processing slices.

9. The method of mapping coordinates of the multi-dimensional tensor of data to the shared storage of the processing unit according to claim 1, wherein the stride is further determined based on a size of the data of the multi-dimensional tensor.

10. The method of mapping coordinates of the multi-dimensional tensor of data to the shared storage of the processing unit according to claim 9, wherein the stride is for a given dimension of the multi-dimensional tensor and the given dimension of the multi-dimensional tensor is dimension three.

11. The method of mapping coordinates of the multi-dimensional tensor of data to the shared storage of the processing unit according to claim 1, wherein the multi-dimensional tensor is a four-dimension tensor.

12. A processing unit for handling a task in response to task data defining at least one operation of the task, comprising at least one multi-dimensional tensor of data, the processing unit comprising:
  a plurality of processing slices for performing a respective sub-operation of the operation of the task, wherein each processing slice comprises:
    a first processing circuitry; and
    a second processing circuitry; and
  a transform unit communicably coupled to each of the plurality of regions,
wherein each processing slice has prioritized access to at least a respective preferred portion of the shared storage than a respective less preferred portion of the shared storage, and wherein a multi-dimensional tensor used in the execution of the task is distributed within the shared storage of the plurality of processing slices, such that the distribution comprises:
  obtaining a layout of the shared storage, the layout indicating the layout of configurable data regions of the shared storage across the plurality of processing slices wherein the configurable data regions are defined in terms of banks comprising regions of the shared storage;
  obtaining a stride for at least one dimension of the multi-dimensional tensor;
  mapping the co-ordinates of the multi-dimensional tensor to locations in the shared storage, wherein the mapping comprises calculating a bank number and an offset, wherein the bank number and offset are calculated based on coordinates of the multi-dimensional tensor, the layout of the configurable data regions and the stride of the at least one dimension; and
  performing, by each processing slice, the respective sub-operation on the data of the multi-dimensional tensor in accordance with the mapping.

13. The processing unit for handling the task according to claim 12, wherein a bank of the shared storage has a high bandwidth connection to the first processing circuitry, and the second processing circuitry of a given processing slice.

14. The processing unit for handling the task according to claim 12, wherein the shared storage is static random access memory.

15. The processing unit for handling the task according to claim 12, wherein the transform unit is further part of a common processing slice, the common processing slice comprising a synchronization unit and the synchronization unit is for determining the stride based on the given dimension of the multi-dimensional tensor.

16. The processing unit for handling the task according to claim 12, wherein each of the plurality of processing slices further comprise accumulator storage.

17. The processing unit for handling the task according to claim 12, wherein the processing unit comprises eight processing slices.

18. A chip-containing product comprising the processing unit of claim 12, wherein the processing unit is assembled on a further board with at least one other product component.

19. A non-transitory computer-readable medium having stored thereon computer-readable code for fabrication of the processing unit for handling a task comprising at least one multi-dimensional tensor of claim 12.

20. A non-transitory computer-readable storage medium comprising a set of computer-readable instructions stored therein which when executed by at least one processor, are arranged to cause the at least one processor to:
  obtain a layout of a shared storage that is logically distributed among a plurality of processing slices of a processing unit, each processing slice performing at least one sub operation of an operation received as part of task data, and having prioritized access to at least a respective preferred portion of the shared storage than a respective less preferred portion of the shared storage, the layout indicating the layout of configurable data regions of the shared storage wherein the configurable data regions are defined in terms of banks comprising regions of the shared storage;
  obtain a stride for at least one dimension of a multi-dimensional tensor and the layout;
  map the co-ordinates of a multi-dimensional tensor to locations in the shared storage, wherein the mapping comprises calculating a bank number and an offset, wherein the bank number and offset are calculated based on coordinates of the multi-dimensional tensor, the layout of the configurable data regions and the stride of the at least one dimension; and
  performing by each processing slice a sub-operation of an operation on data of the multi-dimensional tensor in accordance with the mapping.

* * * * *